United States Patent
Perez et al.

(10) Patent No.: US 11,594,147 B2
(45) Date of Patent: Feb. 28, 2023

(54) INTERACTIVE TRAINING TOOL FOR USE IN VOCAL TRAINING

(71) Applicant: VOIXTEK VR, LLC, Palm Beach Gardens, FL (US)

(72) Inventors: Juan Felipe Perez, Palm Beach Gardens, FL (US); Ronald Warren Anderson, Palm Beach Gardens, FL (US)

(73) Assignee: VOIXTEK VR, LLC, Palm Beach Gardens, FL (US)

( * ) Notice: Subject to any disclaimer, the term of this patent is extended or adjusted under 35 U.S.C. 154(b) by 194 days.

(21) Appl. No.: 16/287,311

(22) Filed: Feb. 27, 2019

(65) Prior Publication Data

US 2019/0266914 A1 Aug. 29, 2019

Related U.S. Application Data

(60) Provisional application No. 62/635,855, filed on Feb. 27, 2018.

(51) Int. Cl.
*G09B 19/00* (2006.01)
*G09B 5/06* (2006.01)
*G09B 15/00* (2006.01)

(52) U.S. Cl.
CPC ........... *G09B 19/003* (2013.01); *G09B 5/065* (2013.01); *G09B 15/00* (2013.01); *G09B 19/00* (2013.01)

(58) Field of Classification Search
CPC ........ G09B 19/003; G09B 19/04; G09B 5/02; G09B 5/06; G09B 5/065
See application file for complete search history.

(56) References Cited

U.S. PATENT DOCUMENTS

| | | | | |
|---|---|---|---|---|
| 6,151,577 A * | 11/2000 | Braun | ............... | G09B 5/04 704/270 |
| 8,907,195 B1 | 12/2014 | Erol | | |
| 9,881,515 B2 | 1/2018 | Moreno | | |
| 2006/0004567 A1* | 1/2006 | Russell | ............ | G09B 19/06 704/E15.045 |
| 2008/0306738 A1* | 12/2008 | Lee | ............ | G09B 19/04 704/236 |
| 2013/0177885 A1* | 7/2013 | Kirkpatrick | ............ | G09B 15/00 434/247 |
| 2015/0056580 A1* | 2/2015 | Kang | ............ | G09B 19/06 434/157 |
| 2016/0321953 A1* | 11/2016 | Kang | ............ | G09B 19/04 |
| 2018/0268728 A1* | 9/2018 | Burdis | ............ | G09B 19/06 |

\* cited by examiner

*Primary Examiner* — Peter R Egloff
(74) *Attorney, Agent, or Firm* — McHale & Slavin, P.A.

(57) ABSTRACT

An interactive system and method for development of the voice, preferably for singing. The system and methods provide and utilize an animated, interactive, preferably 3D, visual character for illustrating the various human physiological components involved in producing vocals, and how best to strengthen and train such components to prevent injury. The system and methods are designed to visually replicate how the human body, and more specifically the internal organs for voice, interact and synchronize muscular movements that are involved in abdominal support, release of air control, and neural stimulation, in unison with Larynx mobility and gravity.

19 Claims, 25 Drawing Sheets

INTERACTIVE TRAINING TOOL FOR USE IN VOCAL TRAINING

REFERENCE TO RELATED APPLICATIONS

In accordance with 37 C.F.R. 1.76, a claim of priority is included in an Application Data Sheet filed concurrently herewith. Accordingly, the present application claims priority to U.S. Provisional Patent Application No. 62/635,855, filed on Feb. 27, 2018, entitled, "INTERACTIVE TRAINING TOOL FOR USE IN VOCAL TRAINING". The contents of the above referenced application are herein incorporated by reference in its entirety.

FIELD OF THE INVENTION

The present invention relates to interactive training systems and methods; and more particularly, to an animated, interactive training system and method for vocal training development.

BACKGROUND OF THE INVENTION

The entertainment business, in general, is estimated to be a trillion-dollar industry worldwide, of which music plays a large role. The music industry is a driving industry within the entertainment sector, and estimated to be worth more than $1.3 billion globally. In addition to the economic influence, music plays a role in the lives of many individuals, regardless of whether one is profiting from such activities or simply singing for non-economic purposes. While many individuals believe that professional singers are simply born with their talent to sing, improving an individual's singing voice is a trainable skill.

Singing, or using one's voice to speak in general, is often taken for granted as a normal, routine human occurrence. However, the ability to speak or sing is a complex human movement which requires the coordination of multiple body organs and systems, including the lungs, the larynx, abdominal muscles, various muscles, mouth, and nervous system. For the voice to produce sound, the diaphragm must contract, allowing the lungs to expand. As this occurs, air is drawn into the lungs. Exhaling causes the diaphragm to relax and the lungs to move upwardly. The size of the lungs is reduced, causing air to be expelled. Exhaling causes air to be forced out to the trachea, through the vocal folds, causing vibration. As the vocal folds vibrate, sound is generated. The actual sound produced is controlled and manipulated by other portions of the human anatomy, including positioning of the tongue, and the larynx. The cheeks, teeth, lips, sinus, chest, laryngeal and pharyngeal cavities all play a role in shaping the sound of the voice as well.

Training the voice is accomplished through repetitive exercises, each designed to strength one or more components of the human anatomy responsible for voice production or manipulation. Damage to any part of the human anatomy responsible for voice production can result in voice problems. While any individual may suffer from voice problems, individuals such as singers, who put great stress on their vocal cords, are more likely to develop problems. The increased risk of injury may also result from continued training and strengthening that singers often undertake to maintain their singing voice and stature.

What is needed in the art, therefore, is an interactive training tool, and methods thereof, that allow users to strengthen their vocals, while preventing or minimizing the risk of damage associated with vocal use or training.

SUMMARY OF THE INVENTION

The present invention is directed towards an interactive system and methods for development of the voice, preferably for singing. The system and methods provide and utilize an animated, interactive, preferably 3D, visual character for illustrating the various human physiological components involved in producing vocals, and how best to strengthen and train such components to prevent injury. The system and methods are designed to visually replicate how the human body, and more specifically the internal organs required for producing vocals, interact and synchronize muscular movements that are involved in abdominal support, release of air control and neural stimulation, in unison with Larynx mobility and gravity. Such interactive representation provides a much better teaching method to provide a user with the correct desired motion, and how such motion affects the overall quality of breath flow and vocal sound production. Such systems, therefore, provide a mechanism to develop healthy singing voices and prevent singers from developing damaging habits. The system and methods utilize multiple training exercises designed to teach the user how to strengthen their vocals in a manner that prevents or reduces overexerting their vocal cords. The system and methods allow for visually appropriating correct applied pressure and posture at correct intervals and timing, thereby producing the desired pitch without affecting the singer's natural tone.

In an illustrative embodiment, an interactive system using a visual character for illustrating various human physiological movements associated with producing vocals comprises an animated, interactive, visual character configured to electronically illustrate one or more various human physiological movements in response to a vocal training module or exercise. The system may further include at least one vocal training module or exercise.

In another embodiment, an interactive method for the development of the voice using a visual character for illustrating the various human physiological components involved in producing vocals comprises the steps of performing at least one vocal training module or exercise, and using an animated, interactive, visual character configured to electronically illustrate one or more various human physiological movements in response to said vocal training module or exercise.

Accordingly, it is an objective of the invention to provide an interactive training system and methods for vocal training development.

It is a further objective of the invention to provide an interactive training method for vocal training development.

It is yet another objective of the invention to provide an interactive training system for vocal training development which minimizes or prevents vocal cord damage.

It is a still further objective of the invention to provide an interactive training method for vocal training development which minimizes or prevents vocal cord damage.

It is a further objective of the invention to provide an interactive training system for vocal training development which minimizes or prevents users from developing damaging habits.

It is yet another objective of the invention to provide an interactive training method for vocal training development which minimizes or prevents users from developing damaging habits.

It is a still further objective of the invention to provide an interactive training method and system for vocal training configured to prevent or minimize erroneous pressure to the voice box.

It is a further objective of the invention to provide an interactive training method and system for vocal training configured to counterbalance common vocal breaks affecting voice production.

It is yet another objective of the invention to provide an interactive training method and system for vocal training configured to visually illustrate how the human anatomy interacts with muscular movements involved in abdominal support stimulation, in unison with Larynx mobility and gravity, to teach the correct desired vocal motion.

It is yet another objective of the invention to provide an interactive training method and system for vocal training configured to visually illustrate how the human anatomy interacts with the release of air control, in unison with Larynx mobility and gravity, to teach the correct desired vocal motion.

It is yet another objective of the invention to provide an interactive training method and system for vocal training configured to visually illustrate how the human anatomy interacts with neural stimulation via singing practice, in unison with Larynx mobility and gravity, to teach the correct desired vocal motion.

It is yet another objective of the invention to provide an interactive training method and system for vocal training configured to visually illustrate how the human anatomy synchronizes with muscular movements involved in abdominal support stimulation, in unison with Larynx mobility and gravity, to teach the correct desired vocal motion.

It is yet another objective of the invention to provide an interactive training method and system for vocal training configured to visually illustrate how the human anatomy synchronizes with the release of air control, in unison with Larynx mobility and gravity, to teach the correct desired vocal motion.

It is yet another objective of the invention to provide an interactive training method and system for vocal training configured to visually illustrate how the human anatomy synchronizes with neural stimulation, in unison with Larynx mobility and gravity, to teach the correct desired vocal motion.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1A:
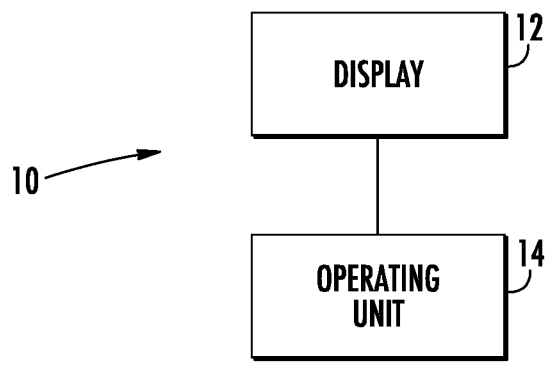
FIG. 1A is a schematic presentation of the components required for visualizing or utilizing the animated, interactive system using visual characters for illustrating the various human physiological components involved in producing vocals.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

The present invention is directed towards an interactive system and methods using hardware and software components for development of the voice, preferably for singing. The system and methods provide an animated, interactive, preferably 3D, visual character for illustrating the various human physiological components involved in producing vocals. The system and methods are designed to visually replicate how the human body, and more specifically, the internal organs are responsible for producing sound, interacting and synchronizing muscular movements that are involved in abdominal support, releasing of air control, and neural stimulation in unison with Larynx mobility and gravity. As such, the system utilizes visual learning methods that allow a user to practice voice/vocal improvement exercises. As the user views or actually participates in the voice exercises, he or she views a human-like or virtual humanoid, three-dimensional character which illustrates what portions of the human anatomy or organs are involved in the exercises. In addition, the system and methods illustrate how the human anatomy, or more specifically, how the human organs actually work, i.e. expand, contract, and vibrate, during each stage of the exercise(s). Such actions made by the virtual humanoid may be termed as virtual humanoid behaviors. In use, a user may be guided through one or multiple singing module exercises in order to improve vocal quality. The user is guided through the exercises visually via a virtual humanoid and verbal instructions. The virtual humanoid is designed to visually instruct the user as to how to perform the exercises in conjunction with visual illustration as to how such exercises affect one or more body organs or parts being used in each exercise. Accordingly, the user not only better understands how to perform the exercise, but they may also better understand how to control the one or more body organs or parts involved. The system and methods described herein are illustrative only, as any number of exercises can be illustrated, and any number of body organs can be associated with such exercises.

The system and methods are preferably configured to be used or visualized using a virtual reality (VR) simulator or headset, but may be configured for other viewing manners. The VR simulator or headset allows the user to virtually perform the exercises while seeing how the body reacts to such exercises. The system and methods may be designed to allow the user to view many different exercises, each different exercise preferably designed to strengthen or improve the user's vocal capabilities. While the systems and methods of the current invention are described in the context of a VR headset with VR graphic user interface (VR-GUI), other GUI may be used if the system and methods are utilized with a standard computing system. Referring to FIG. 1A, the animated, interactive training system for vocal training development, referred to generally as system 10, is shown.

Figure 1B:
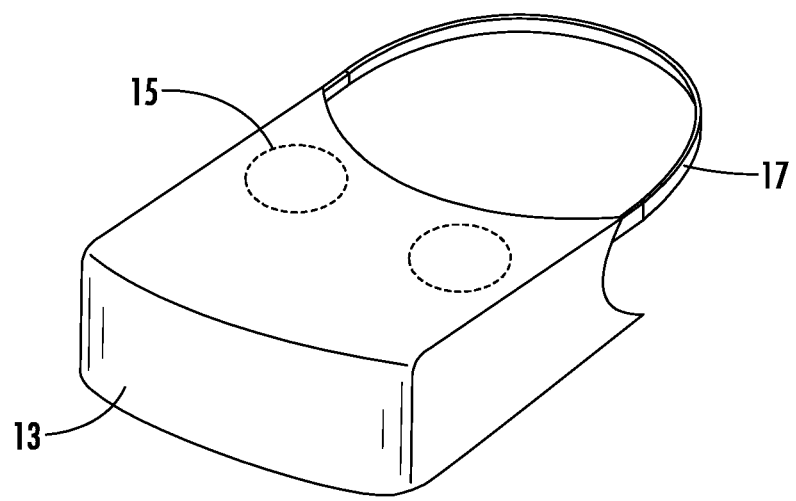
FIG. 1B is an illustrative example of a virtual reality headset.

The system 10 comprises a display unit 12 and an operating unit 14. The display unit 12 is preferably a head mounted display, such as a VR headset display 13, shown with a viewing lens 15 and strap 17, see FIG. 1B. Alternatively, the display unit 12 may be a traditional LCD monitor device. The operating unit 14 may be a computer including one or more central processing units (CPU(s)) coupled to memory and networking hardware. The networking hardware is operatively connected with the CPU(s) such that the CPU(s) can process network traffic inbound from the Internet and deliver outbound network traffic to the Internet utilizing, for example, a multi-layered networking protocol, such as TCP/IP. The memory may include both volatile and non-volatile memory, and stores program code executable by the one or more CPU(s). The program code causes the CPU (s) to perform various functions, i.e. one or more voice exercises, corresponding virtual humanoid behaviors, and scoring.

Figure 2:
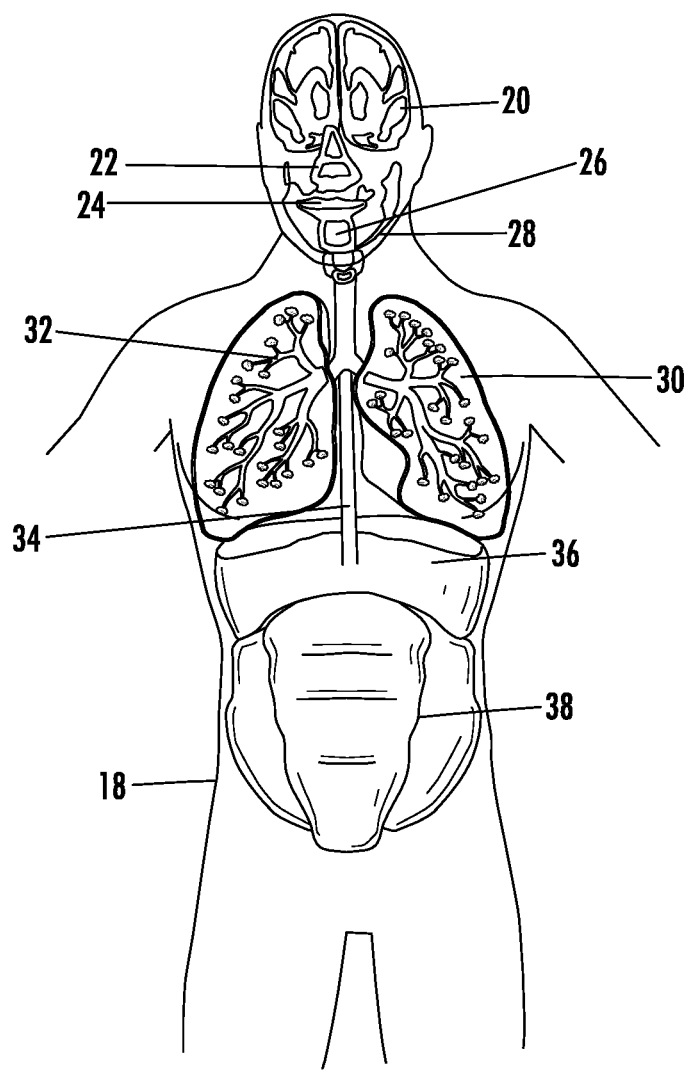
FIG. 2 is an illustrative example of a virtual humanoid for use in the animated, interactive training system and method for vocal training development.

Referring to FIG. 2, an illustrative example of the virtual humanoid 16 is shown. The virtual humanoid 16 comprises a body 18 having one or more human anatomy portions or organs. As illustrated in FIG. 2, the one or more human anatomy portions, structures, or organs include an image of the human brain 20, an image of the human nasal cavity 22, an image of the human lip 24, an image of the human tongue 26, an image of the human jaw 28, an image of the human lungs 30, an image of the human bronchioles 32, an image of the human spinal cord 34, an image of the human diaphragm 36, and an image of the human abdomen 38. Additional human anatomy images (including bone, cartilage, and muscles) may be displayed; including, but not limited to, an image of the cricoid cartilage, thyroid cartilage, Hyoid bone, or nasopharynx. The images of each of the human anatomy portions, structures, or organs may be color coded for ease and quick identification. Each human anatomy portion or organ illustrated by the virtual humanoid 16 may be highlighted to visually aid the user in understanding how the human body components function while 1) a person sings, and/or 2) while performing any one of the singing methods as part of the system 10.

Figure 3:
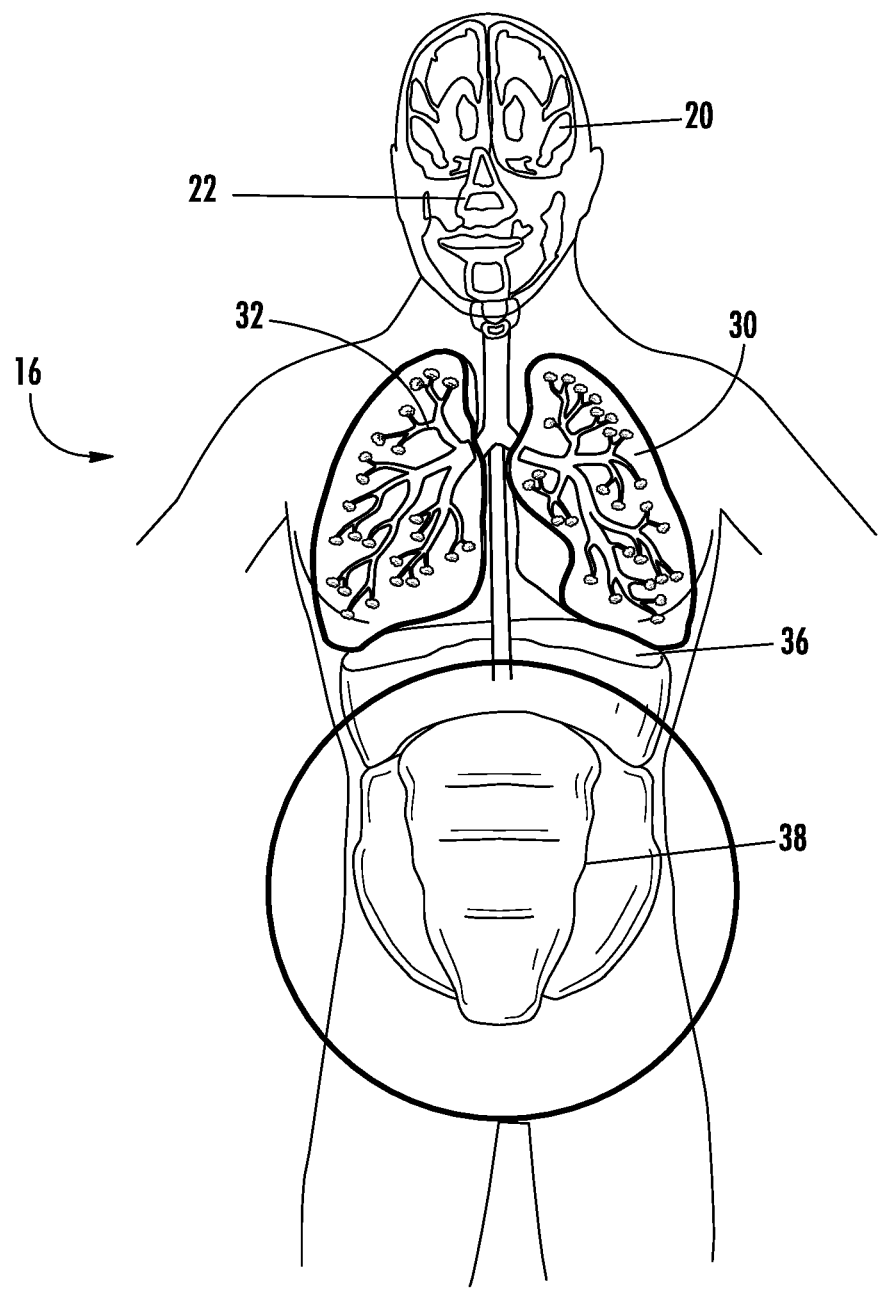
FIG. 3 is a front view illustrating the virtual humanoid in a relaxed position.
Figure 4:
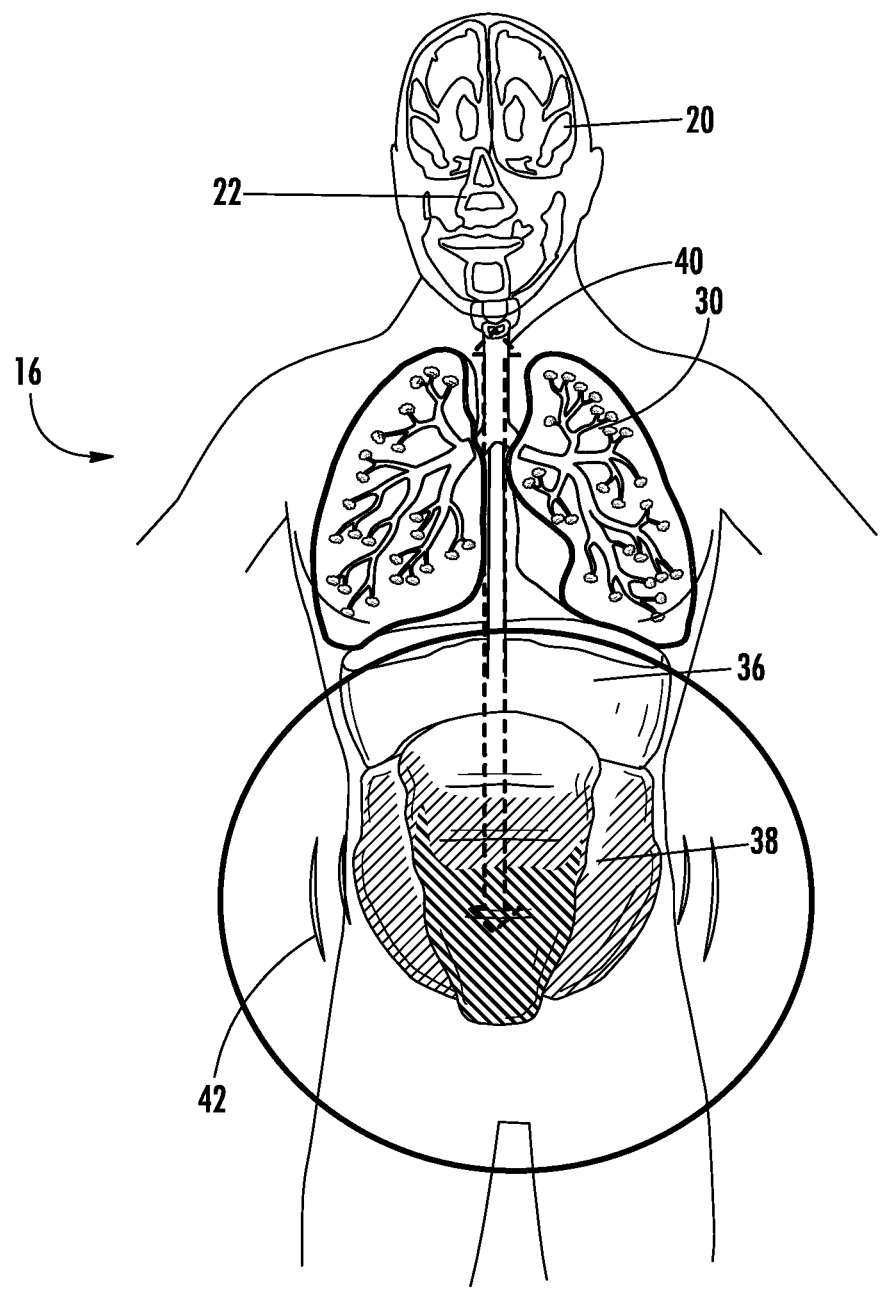
FIG. 4 is a front view illustrating the virtual humanoid in a press out position.
Figure 5:
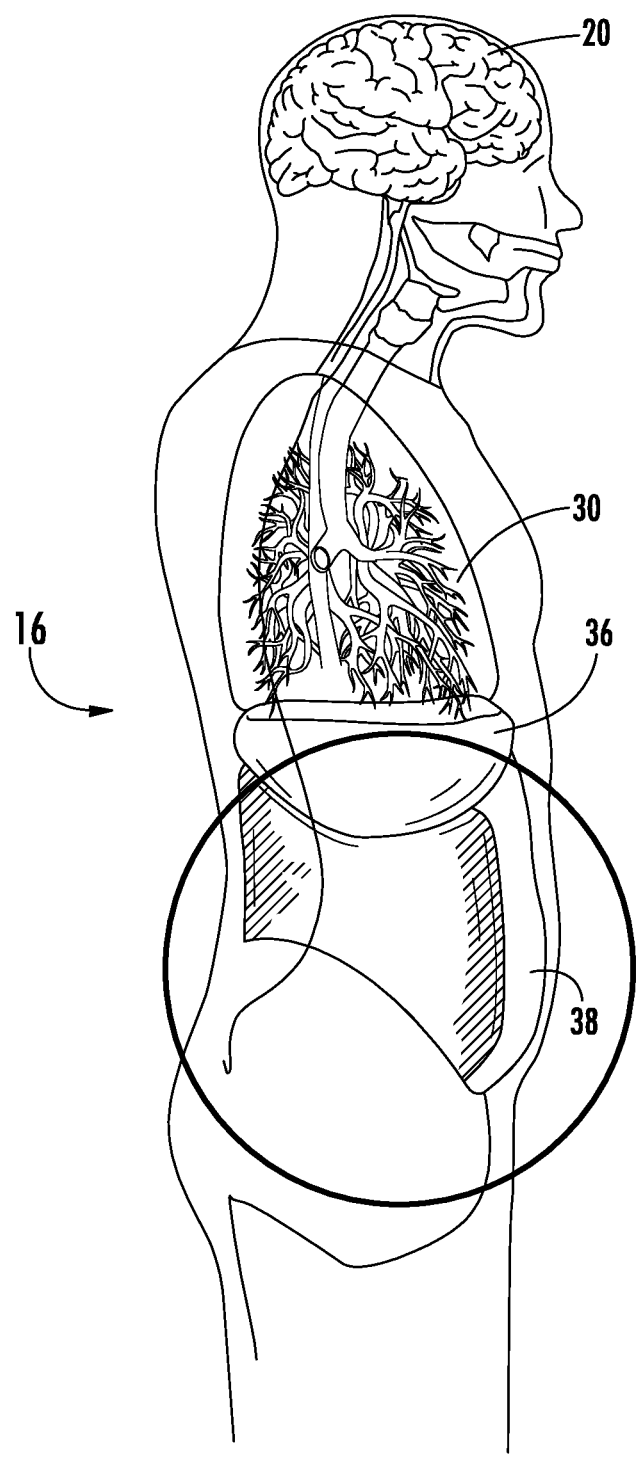
FIG. 5 is a lateral view illustrating the virtual humanoid in a relaxed position.
Figure 6:
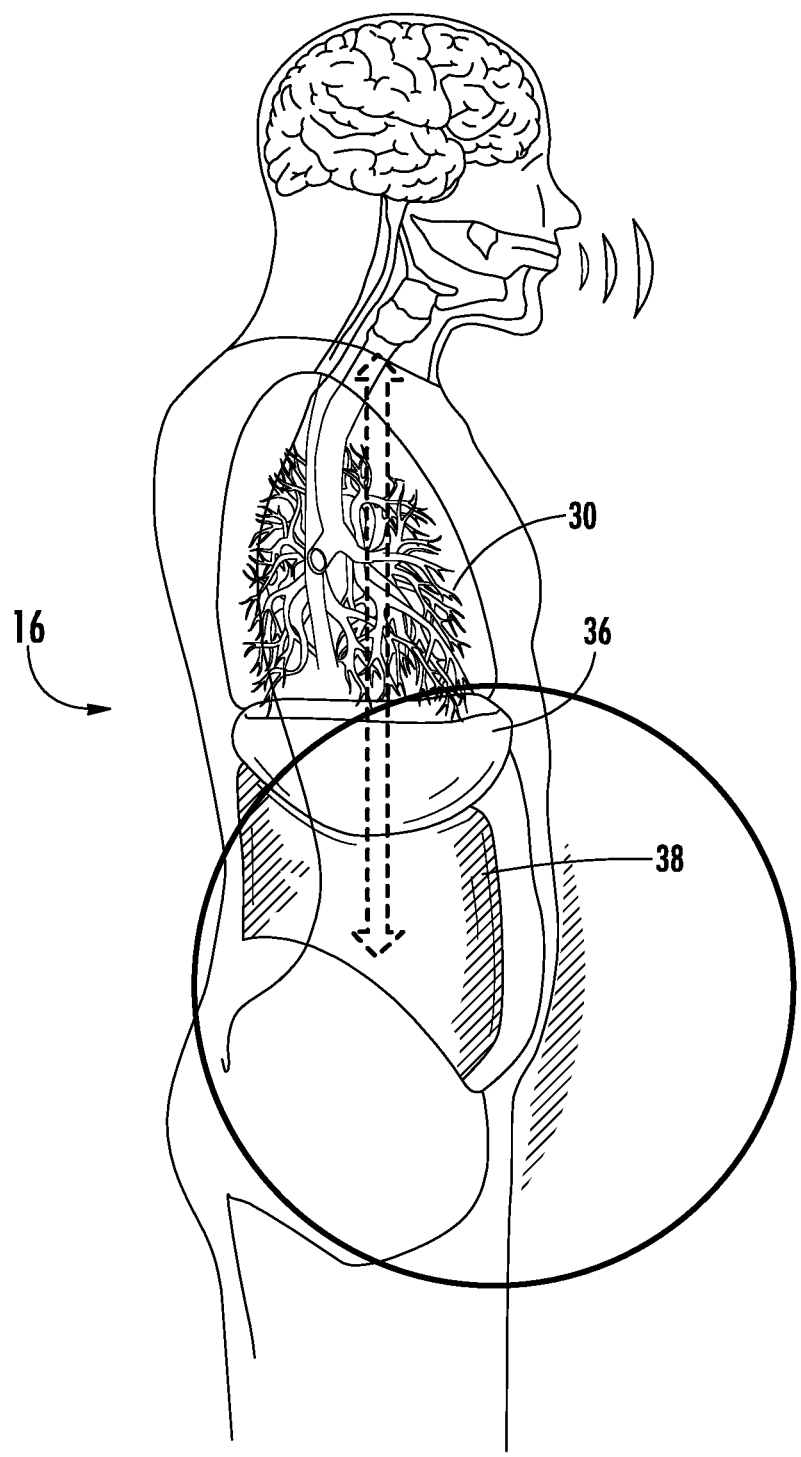
FIG. 6 is lateral view illustrating the virtual humanoid in a press out position.

FIGS. 3 and 4 provide illustration of the virtual humanoid 16 with regards to abdominal movement. FIG. 3 is a front view illustrating the virtual humanoid 16 in a relaxed position. In one of the vocal exercises performed by a user, he or she may do a press out movement. The press out movement illustrates to the user the correct abdominal muscular behavior for supporting the sound and saving the throat from stress and constriction. The virtual humanoid 16 further provides illustration for the user on how to achieve the production of sound in a healthy way with exact timing, and how to do it properly to avoid damage to the vocal cords, limiting the user's overdrive, a normal cause for nodule formation. As such, the virtual humanoid 16 is programmed to show correct movement(s) of the abdominal portion 38 during singing or in conjunction with a particular vocal exercise so the user has a visual understanding of what to expect, i.e. how the human anatomy organ should behave or function, and the timing of such actions relative to the singing action or exercise. FIG. 4 is a front view illustrating the virtual humanoid 16 in a press out position. FIGS. 5 and 6 provide the user with alternative views (lateral views) of the virtual humanoid 16 in a relaxed position (FIG. 5) or in the press out position (FIG. 6). The virtual humanoid 16 may utilize various visual features, such as the Yellow double arrow 40 or white waves 42 that radiate out from the abdominal portion 38, seen in FIG. 4, to aid in visualizing or provide a visual que as to how the internal organs are moving as a result of the individual singing or performing the vocal exercises.

Figure 7:
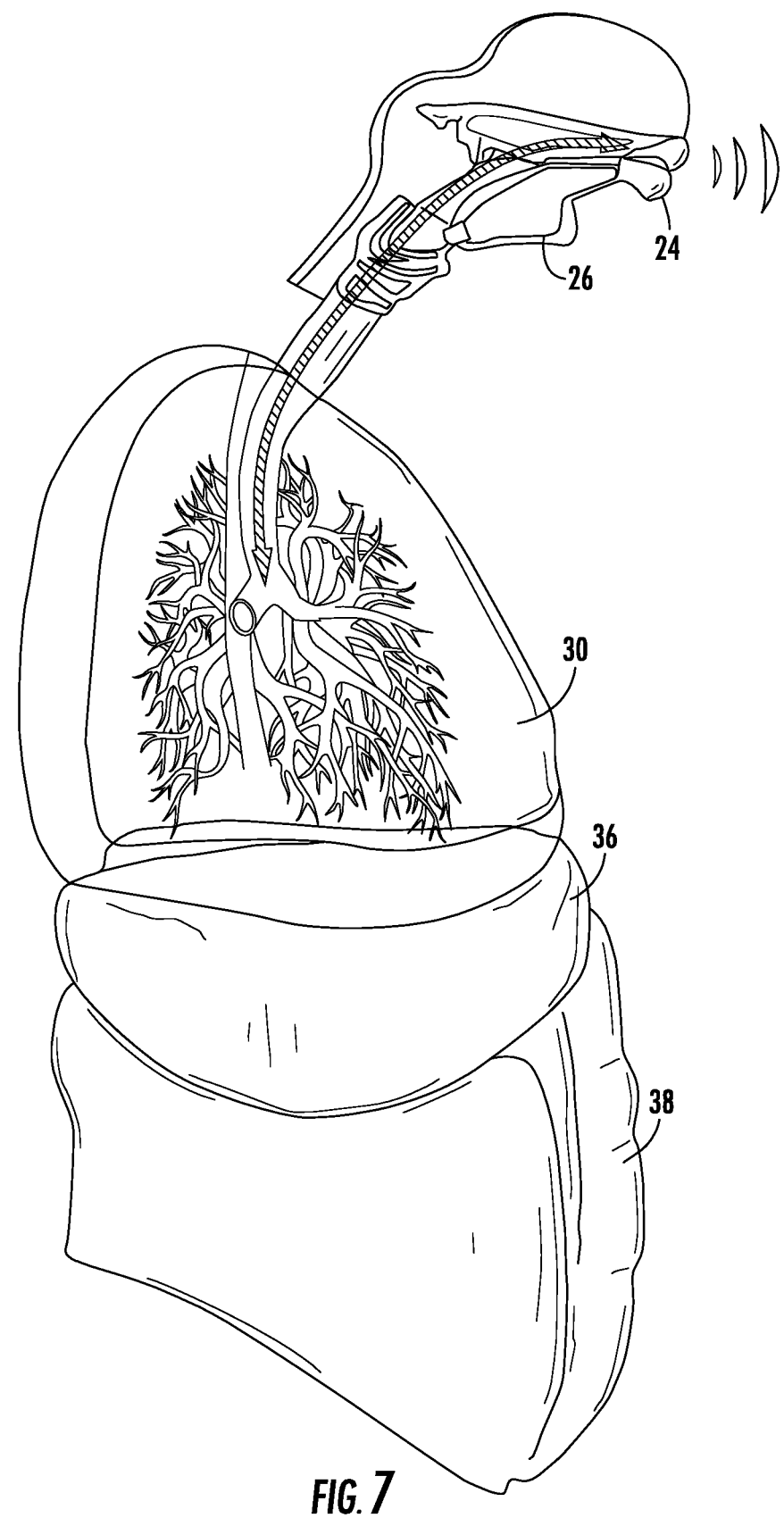
FIG. 7 illustrates the physiological components of the virtual humanoid which are associated with breathing.

FIG. 7 illustrates the physiological components of the virtual humanoid 16 which are associated with breathing. The virtual humanoid 16 is configured to provide illustration of breathing, inhalation, exhalation and sound emission. Each part of the human physiology is designed to visually glow and be highlighted at specific times. The system 10, and methods, is configured to provide the user with both a detailed explanation about "how not to" perform the exercise, and the best or correct way to perform the exercise in order to alleviate the subglottal pressure, as support is constantly applied and air exhalation becomes minimal during even the most powerful of notes. A video explanation about the health benefits, correct postures, and proper musculature control may also be provided.

Figure 8A:
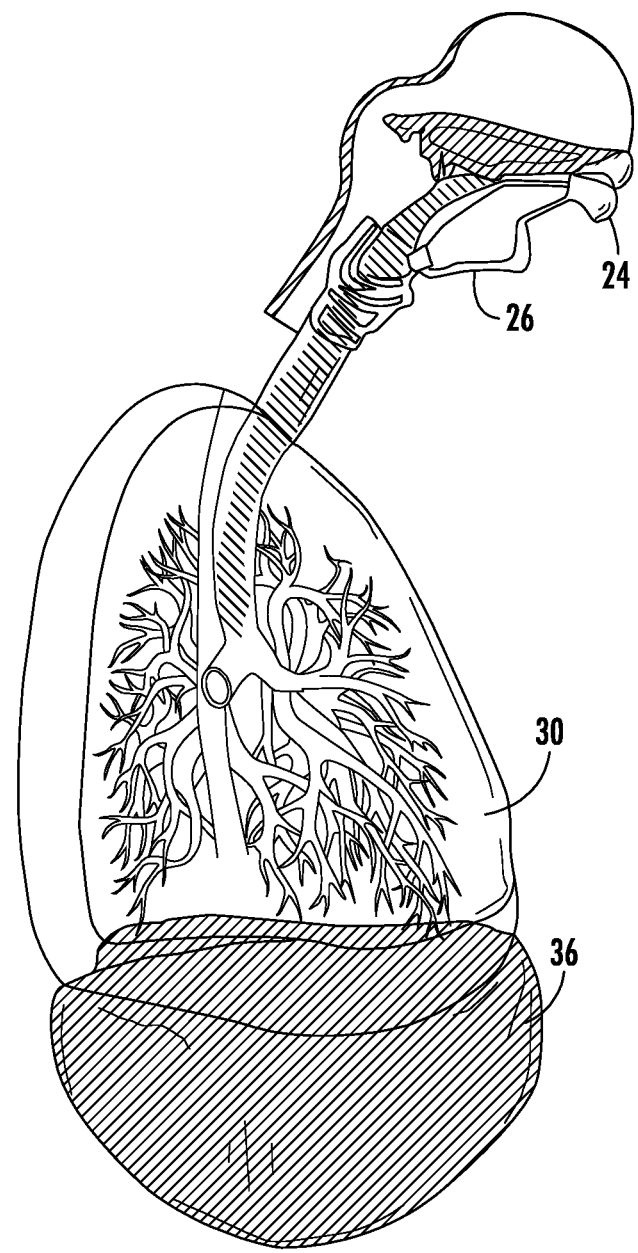
FIG. 8A illustrates the physiological components of the virtual humanoid which are associated with airflow.
Figure 8B:
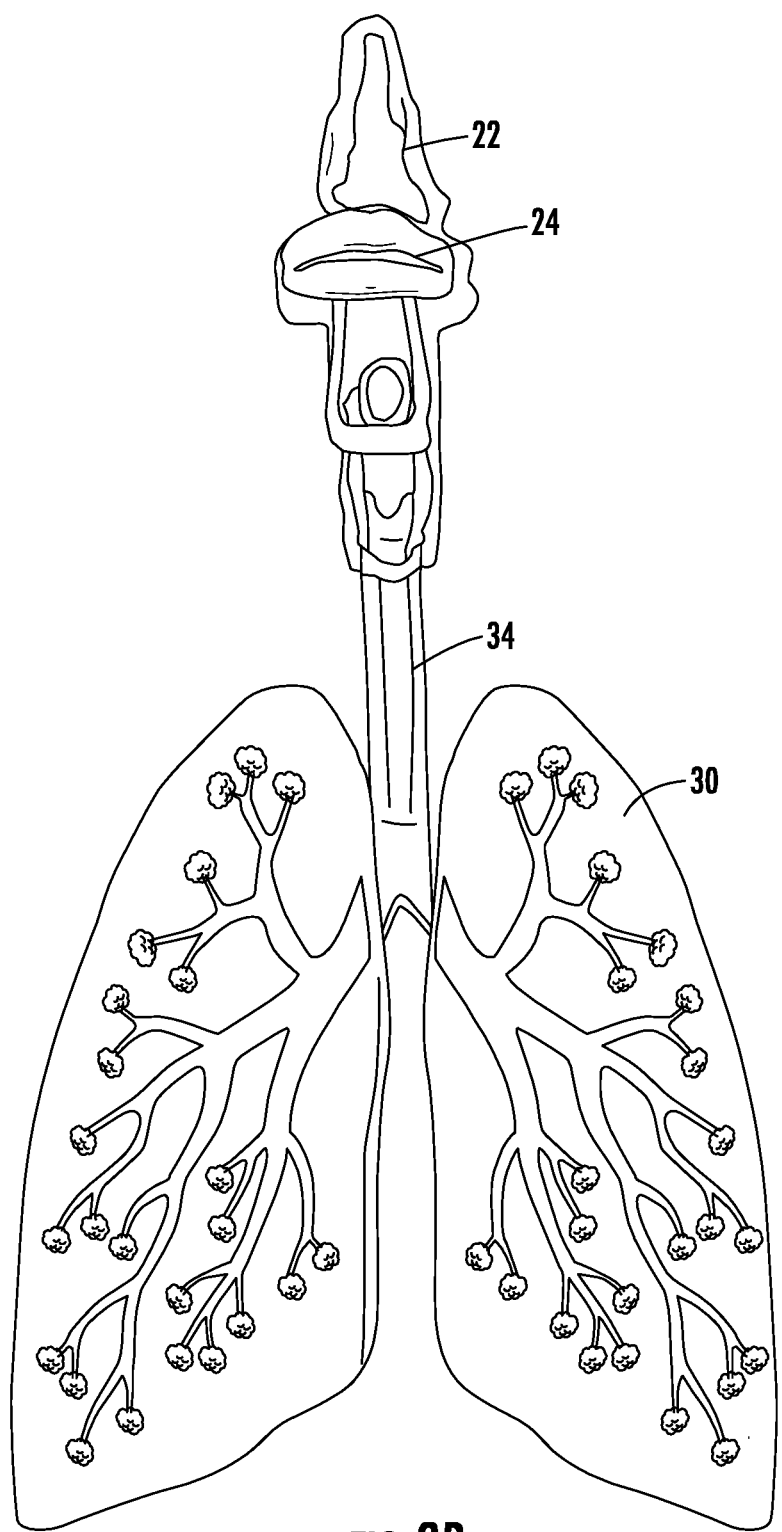
FIG. 8B is an alternative view of the physiological components of the virtual humanoid which are associated with airflow.

FIGS. 8A and 8B illustrate the physiological components of the virtual humanoid 16 which are associated with airflow. The system 10 and methods are configured to provide animation relating to air flow. The air flow animation for each exercise is configured to teach the user how to adapt to tempo, and pause and pace muscle activity, representing how each exercise must be performed. The airflow animation may show the user the proper behavior of the lungs, and how the release of air happens in the lightest of forms, thereby eliminating an unnecessary effort in the production of sound. Such actions help eliminate the unnecessary "breaks" that singers need to avoid when improper technique is followed.

Figure 9:
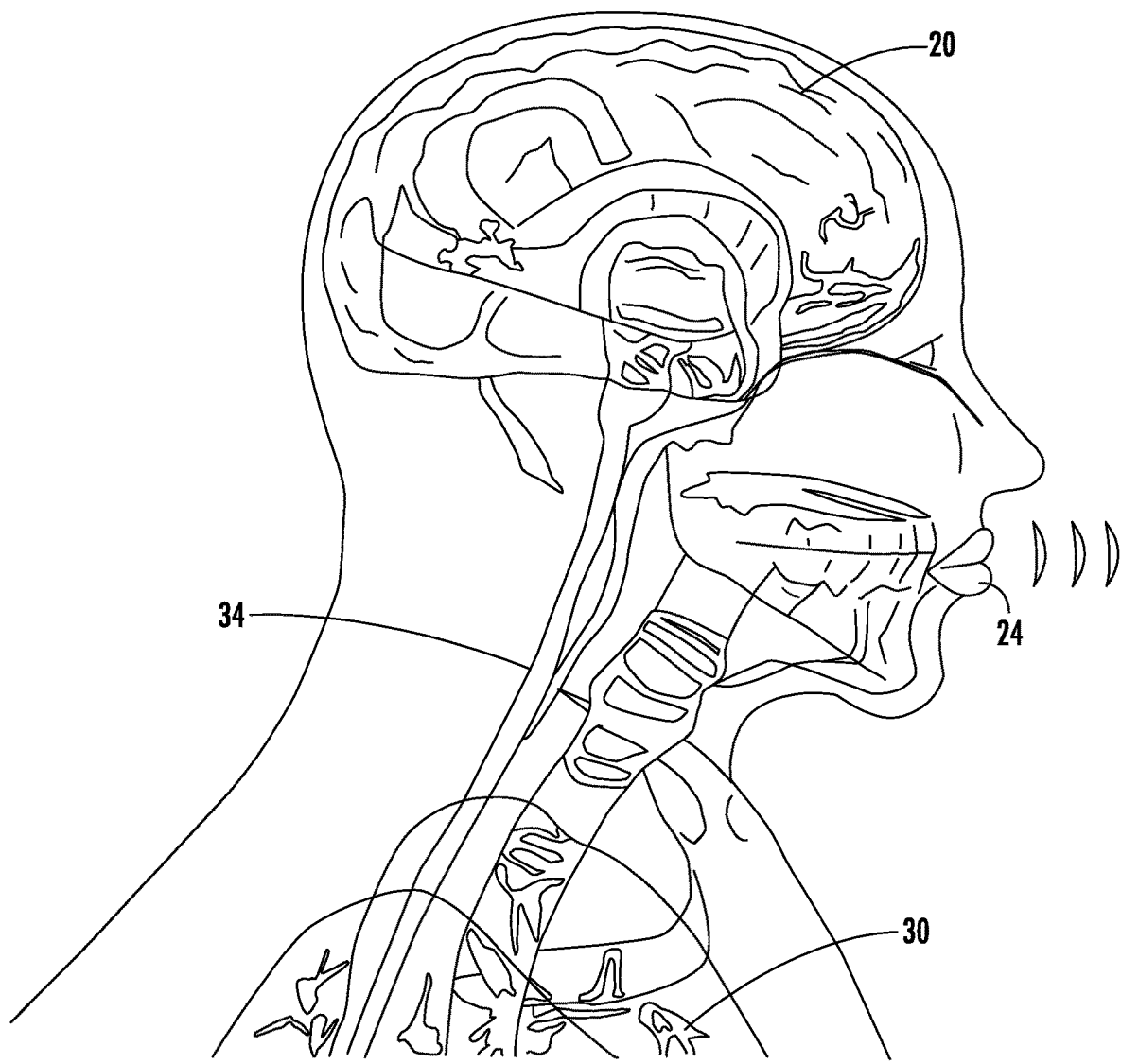
FIG. 9 is an illustrative example of the virtual humanoid illustrating constant air flow.
Figure 10:
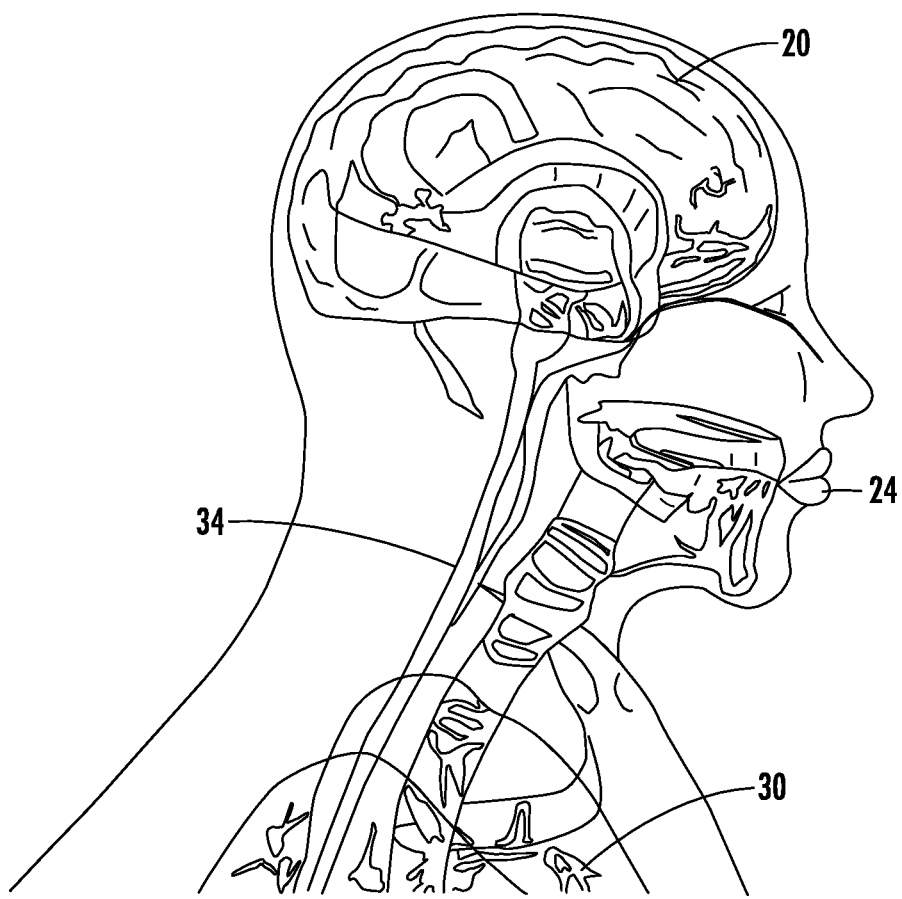
FIG. 10 is an illustrative example of the virtual humanoid 16 illustrating inhalation.

FIG. 9 is an illustrative example of the virtual humanoid 16 illustrating constant air flow. FIG. 10 is an illustrative example of the virtual humanoid 16 illustrating inspiration (inhalation).

Figure 11:
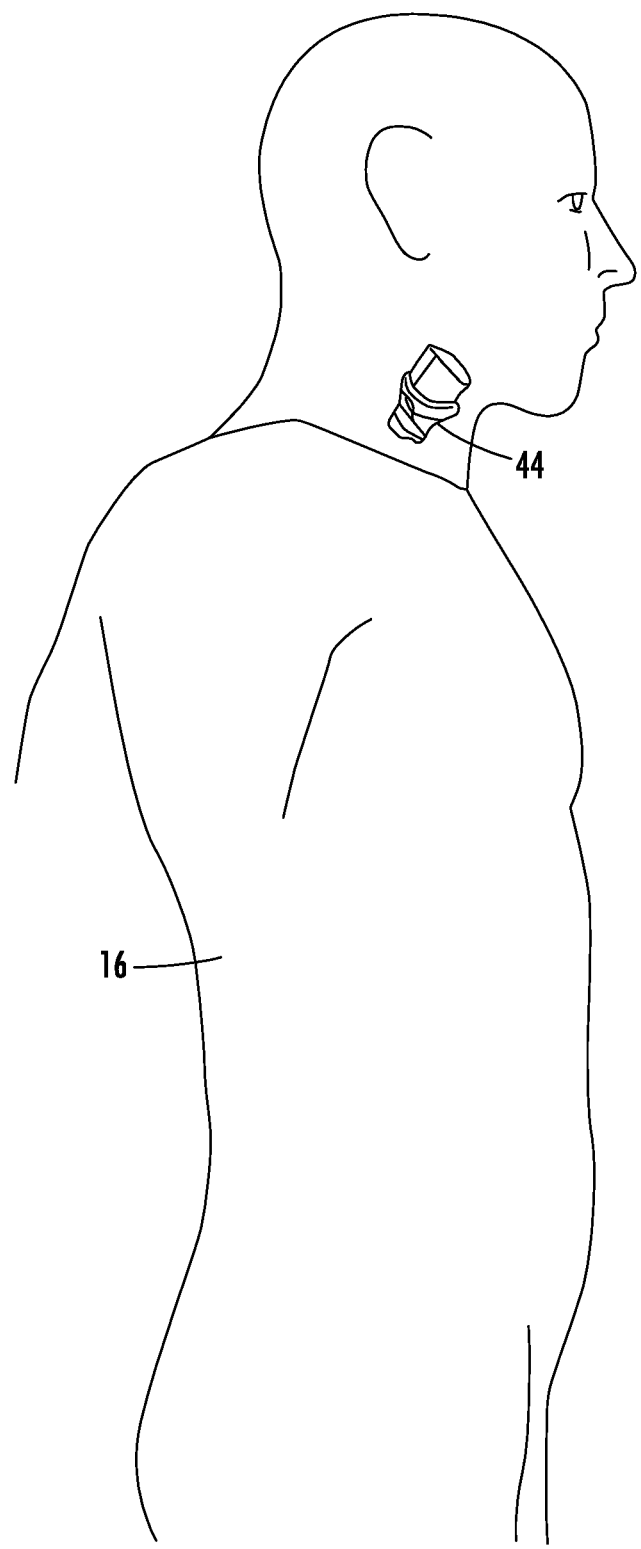
FIG. 11 is an illustrative example of the virtual humanoid, illustrating the location of the larynx.
Figure 12:
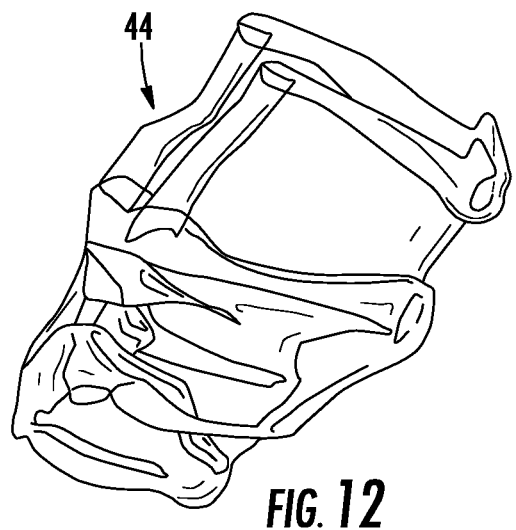
FIG. 12 illustrates a representative view of the virtual humanoid larynx.
Figure 13:
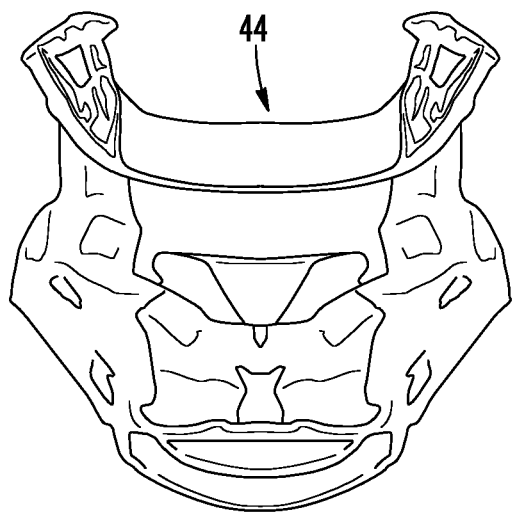
FIG. 13 is an alternative view of the virtual humanoid larynx.

FIGS. 11-13 illustrate the physiological interactions relating to the larynx. FIG. 11 illustrates the illumination and highlighting of the larynx 44 of the virtual humanoid 16. In this manner, the system 10, and methods thereof, provides for a mechanism to illustrate the function and movements of the larynx 44 during singing movements, or during the one or more exercise tutorials. The larynx animation associated with the system 12, and methods thereof, is configured to illustrate the correct movement at a given time. Such feature may help a user in achieving correct posture and technique, and obtaining vocal control. This will also ease the load of constriction, thus preventing the development of undesired vocal abuse and its derivative factors that trigger nodules, polyps or cysts. It is imperative that, during the production of sounds, there is "no break" whatsoever. For this reason, the larynx 44 needs to be accommodated into a position that allows this flow to be light. This allows the user to control the larynx 44. FIGS. 12 and 13 provide illustrative views of the larynx 44 as part of the system 10.

Figure 14:
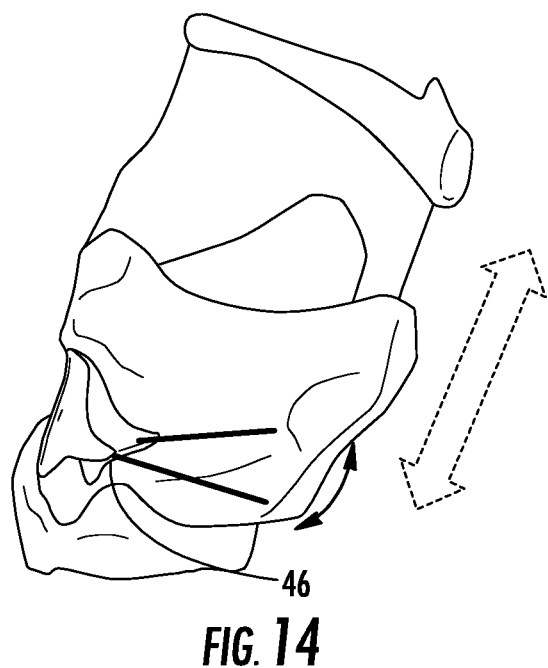
FIG. 14 illustrates the downward translation of the larynx for improved vocal cord opening and relaxation.

Referring to FIG. 14, the physiological and anatomical interactions relating to the vocal fold is shown. The figure illustrates a portion of the virtual humanoid 16 vocal cords 46. By including this capability, the system 10 and methods thereof provide a mechanism to allow the user to understand what optimal vocal cord behavior is and how to keep the vocal cords trained to avoid vocal abuse. The system 10 and methods thereof are configured to illustrate the transitional and rotational movements that allow the ligaments to relax during the singing process, thus avoiding disease or abuse to the vocal folds themselves. FIG. 14 illustrates downward translation of the larynx for improved cord opening and relaxation.

Figure 15:
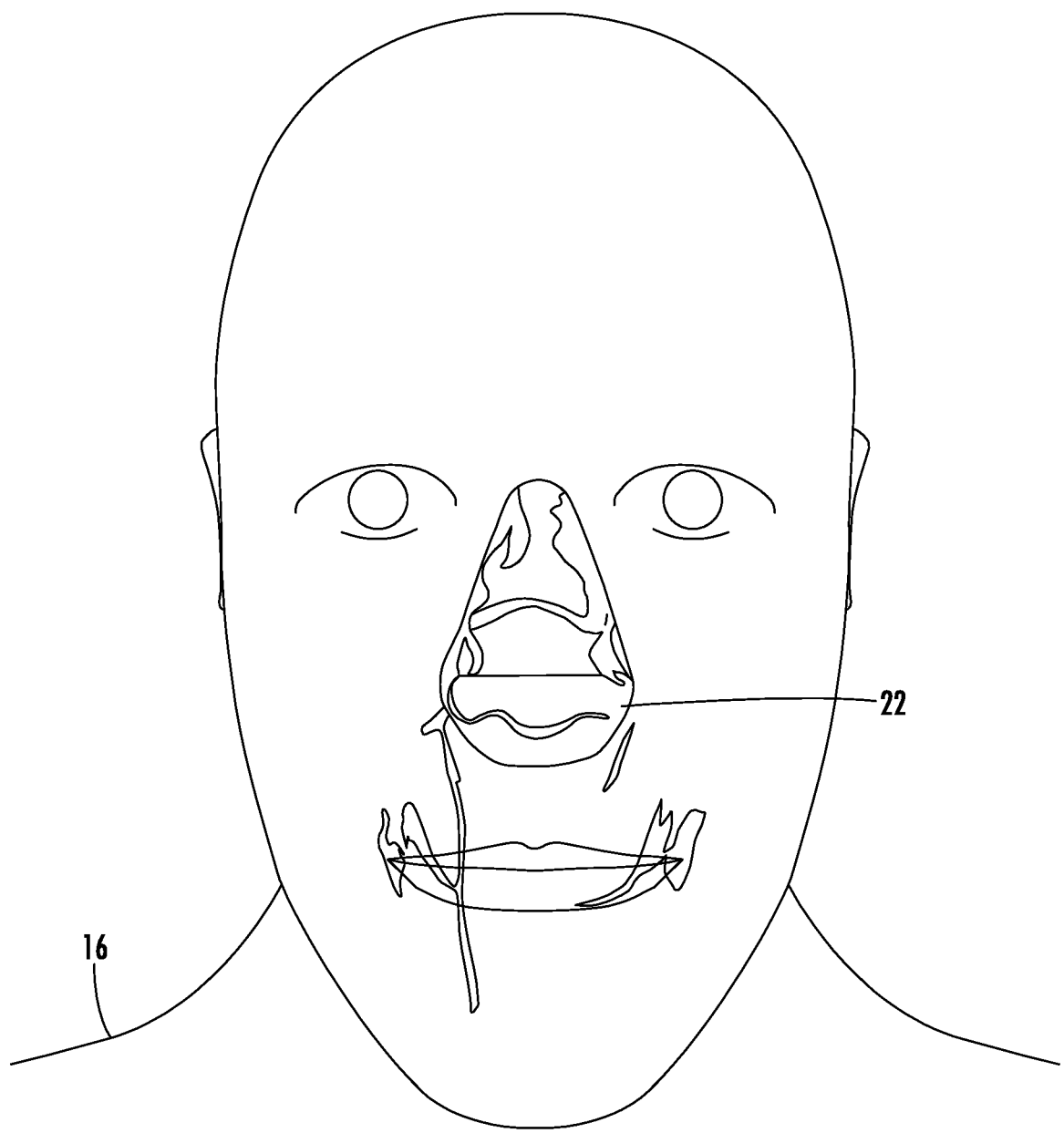
FIG. 15 illustrates the physiological and anatomical interactions relating to the vocal fold.

Referring to FIG. 15, the physiological and anatomical interactions relating to the nasal cavity are shown. The figure illustrates a portion of the virtual humanoid 16 nasal cavity 22. The nose is an important site for sound placement. The system 10, and methods thereof, are configured to teach, through animation, how to remain at peak level using the nasal cavity for the improvement of sound, described by aleatory particle simulation.

Figure 16A:
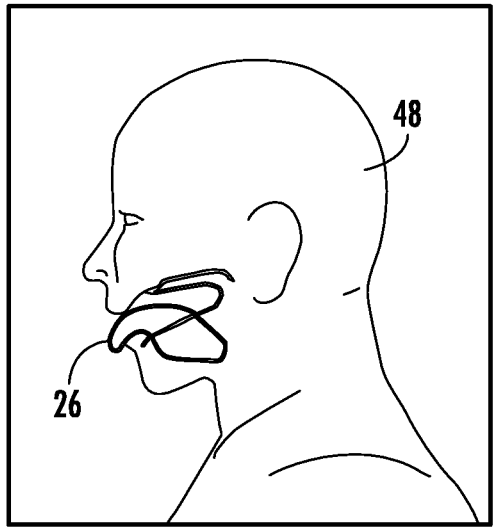
FIG. 16A illustrates a humanoid head with an image of a tongue in a full out light extension position.
Figure 16B:
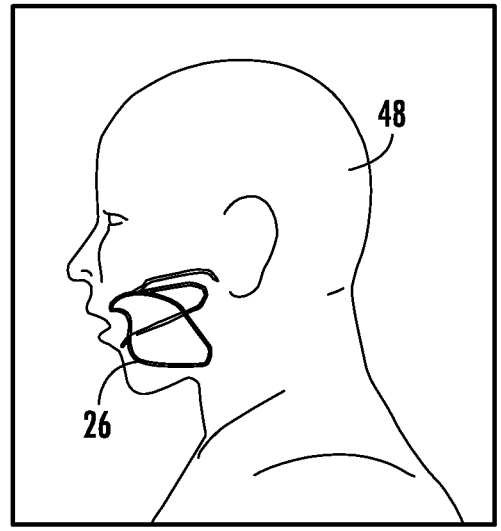
FIG. 16B illustrates a humanoid head with an image of a tongue in a soft palate motion.
Figure 16C:
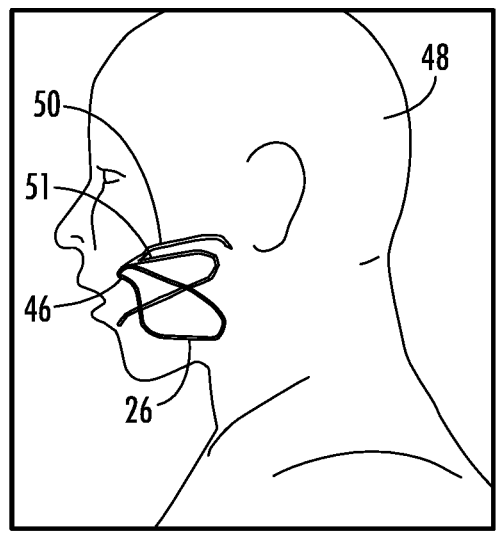
FIG. 16C illustrates a humanoid head with an image of a tongue touching the posterior upper teeth and hard palate.
Figure 16D:
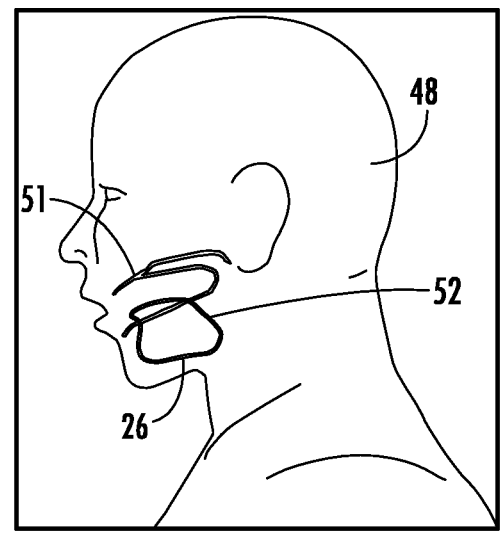
FIG. 16D illustrates a humanoid head with an image of a tongue in a relaxed position, touching the backside of the bottom teeth backside.
Figure 16E:
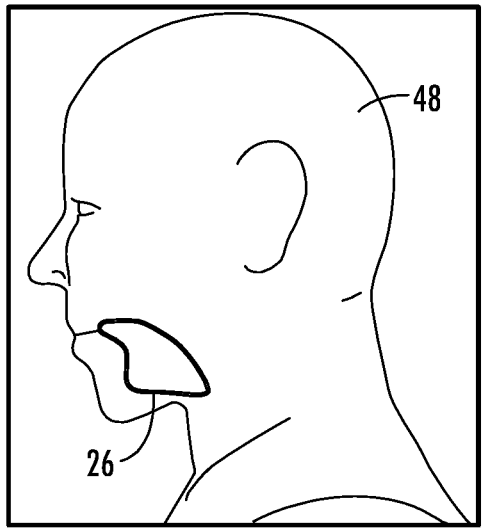
FIG. 16E illustrates a humanoid head with an image of a tongue in the yawn position.
Figure 16F:
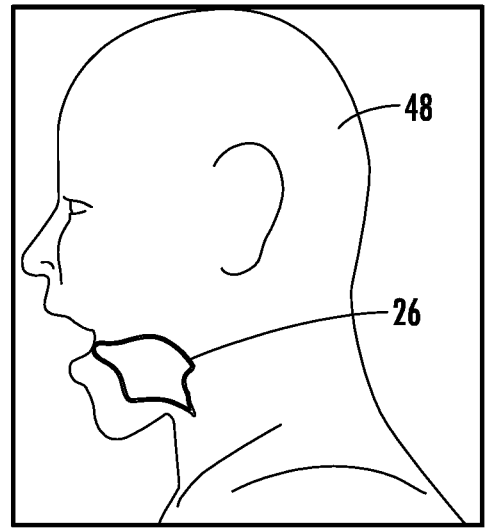
FIG. 16F illustrates a humanoid head with an image of a tongue relaxed in front of the lower teeth.
Figure 16G:
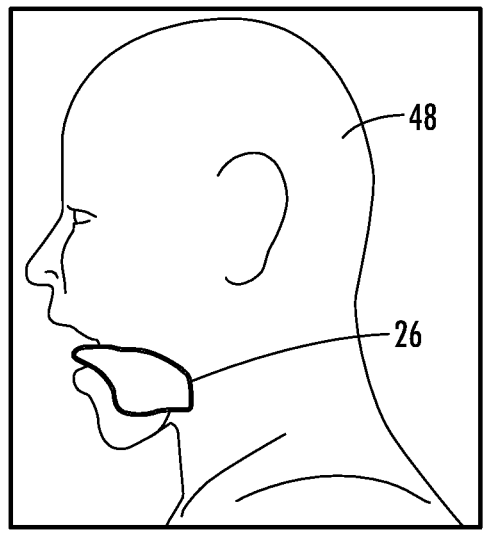
FIG. 16G illustrates a humanoid head with an image of a tongue with motion toward the hard palate.
Figure 16H:
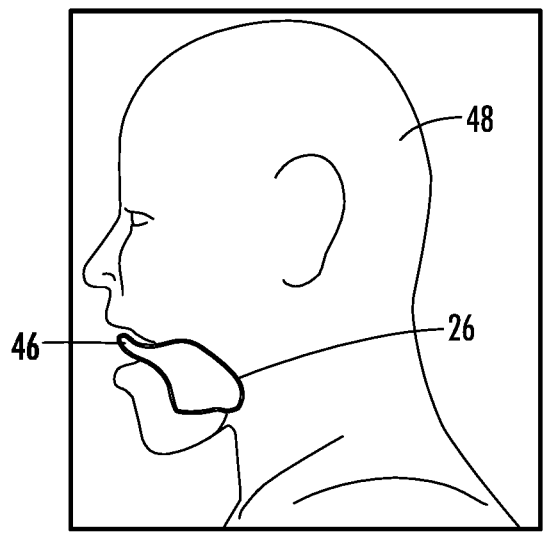
FIG. 16H illustrates a humanoid head with an image of a tongue positioned in front of the top teeth.

Referring to FIGS. 16A-16H, the physiological and anatomical interactions relating to the positioning of the tongue are illustrated. The images represent what a user might see with regards to exercises that focus on tongue positioning. In FIG. 16A, the virtual humanoid head 48 is shown with the tongue 26 in a full out light extension position. FIG. 16B illustrates a soft palate motion. FIG. 16C illustrates the tip 46 of the tongue 26 touching the posterior upper teeth 51 and hard palate 50. FIG. 16D illustrates the tongue 26 in a relaxed position, touching the backside of the bottom teeth 52. FIG. 16E illustrates the tongue 26 in the yawn position. FIG. 16F illustrates the tongue 26 relaxed in front of the bottom teeth 52. FIG. 16G illustrates the tongue 26 with motion towards the hard palate 50. FIG. 16H illustrates the tip 46 of the tongue 26 positioned in front of the upper teeth 51.

Figure 17A:
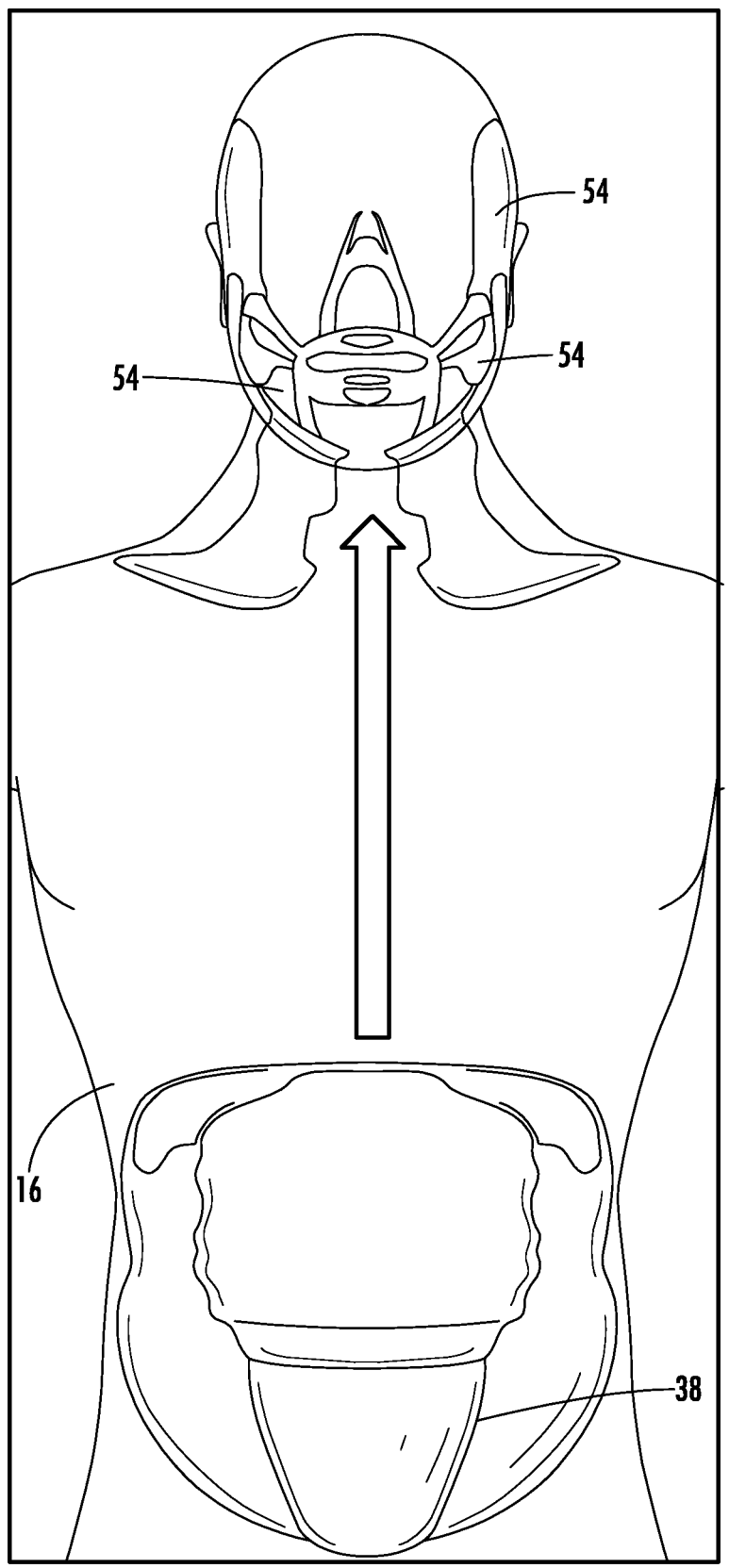
FIGS. 17A-17E illustrate the physiological and anatomical interactions relating to use of facial muscles.
Figure 17B:
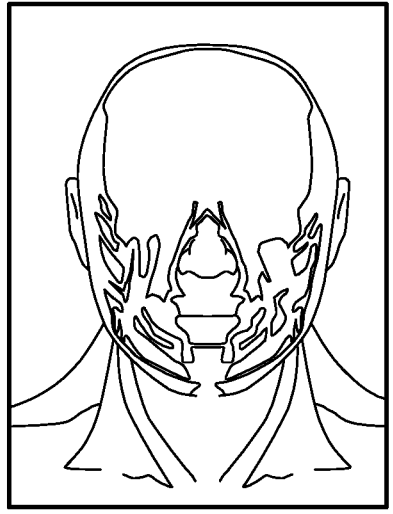
Figure 17C:
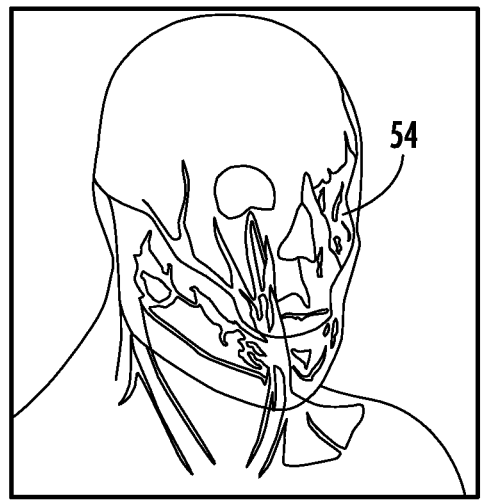
Figure 17D:
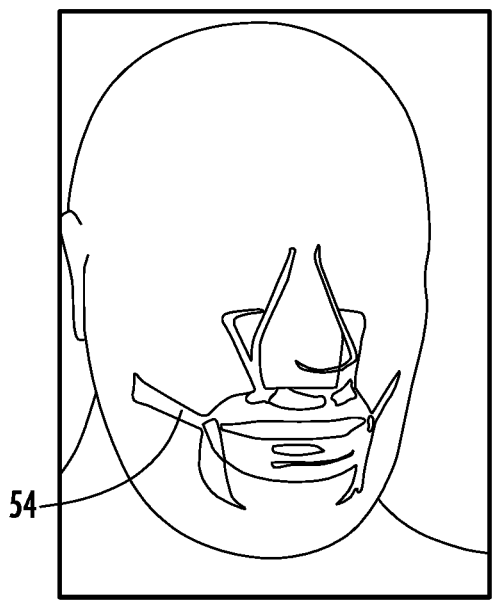
Figure 17E:
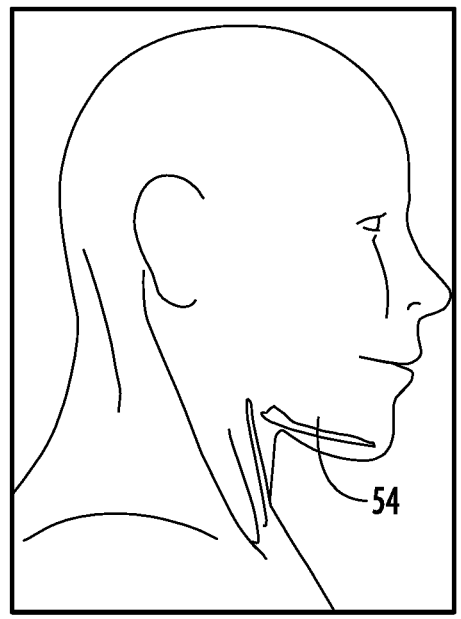

Referring to FIGS. 17A-17E, the physiological and anatomical interactions relating to use of facial muscles are shown. The system 10 and methods thereof are configured to visually identify how to correctly manipulate facial muscles 54 and to align them with precision movements for each exercise provided. This visualization allows the user to ensure muscle control, providing easier flow of air when producing high notes with minimal effort. Correct use of the body, skull, and facial musculature allows for better singing performance. FIG. 17A illustrates the virtual humanoid 16 with facial musculature 54. FIGS. 17B-17E illustrate different facial musculature 54 positions.

Figure 18:
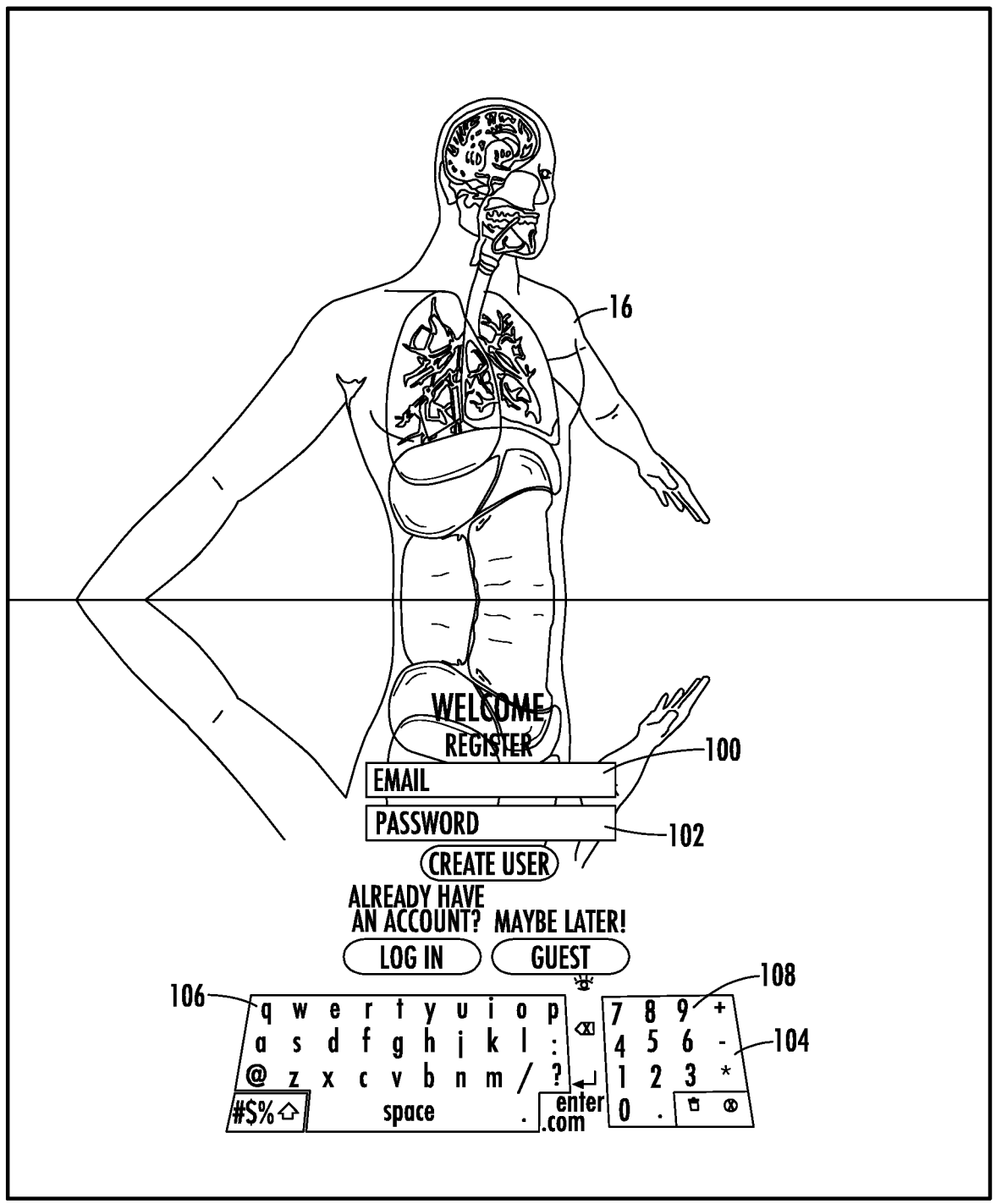
FIG. 18 is an illustrative example of a screen shot of the interactive training tool.
Figure 19A:
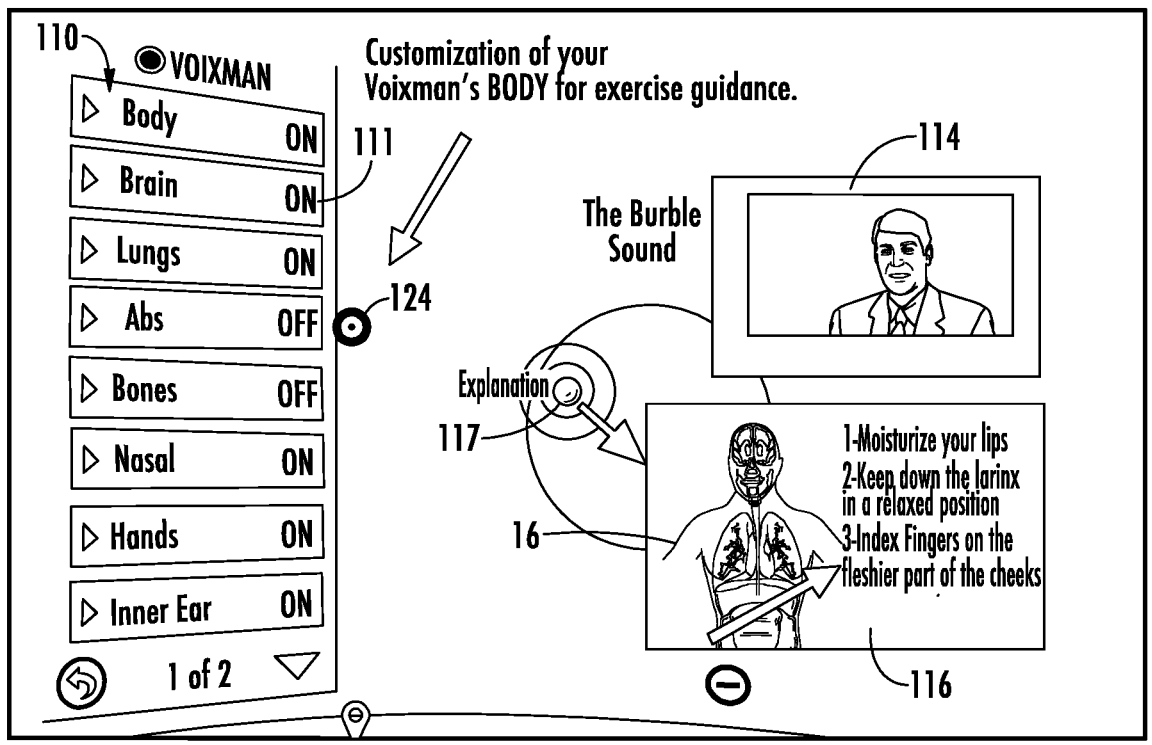
FIG. 19A is an example of an alternative screen shot of the interactive training tool.
Figure 19B:
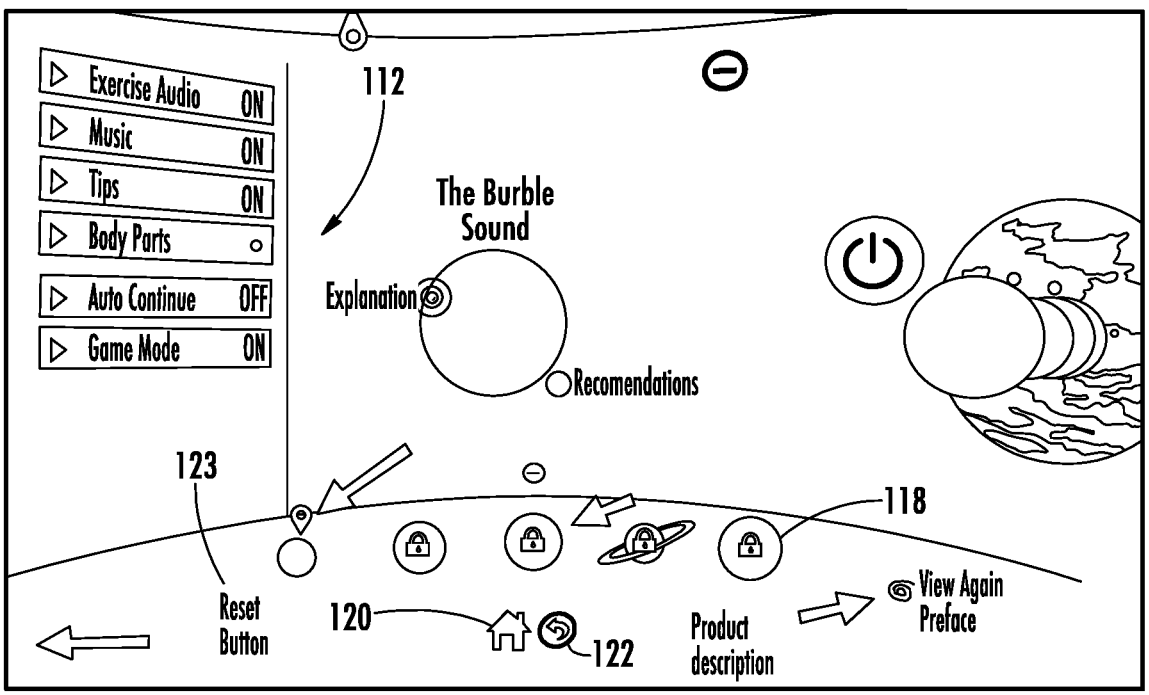
FIG. 19B is an example of an alternative screen shot of the interactive training tool.

FIGS. 18-24 provide illustrative screen shots of several views as the user utilizes the methods in accordance with the present invention. Referring to FIG. 18, the user may log into the system 10 by typing in an email address in the email box 100 and a password in the password box 102. A virtual keyboard 104, with letters 106 and numbers 108, may be displayed to help the user type in the email address and the password. Upon successful log in, the next view may include a body parts menu 110, see FIGS. 19A and 19B. Accessing the various body parts, such as Brain 111, allows a user to change one or more features or settings related to the brain portion of the virtual humanoid 16. The body parts menu allows the user to customize the body of the virtual humanoid 16. An experience menu 112 for adjusting various user settings may also be included. The view shown in FIG. 19A may also include both a recorded video message 114 and a virtual humanoid message 116, each accessed by explanation icon 117. The recorded video message 114 is preferably a prerecorded message from an actual person, explaining how the system may work. The virtual humanoid message 116 may provide information or descriptions relating to the virtual humanoid 16. At the bottom of the screen view, a user may be notified if a screen is not accessible, see lock icon 118. The user may be able to go to a home page by clicking on the home button 120 or back button 122. Hitting the reset button 123 resets any changes made by the user back to an initial or default setting. The red circle 124 allows the user to control which feature he/she wants to access, acting like a mouse, but controlled with movement of the head or eyes.

Figure 20:
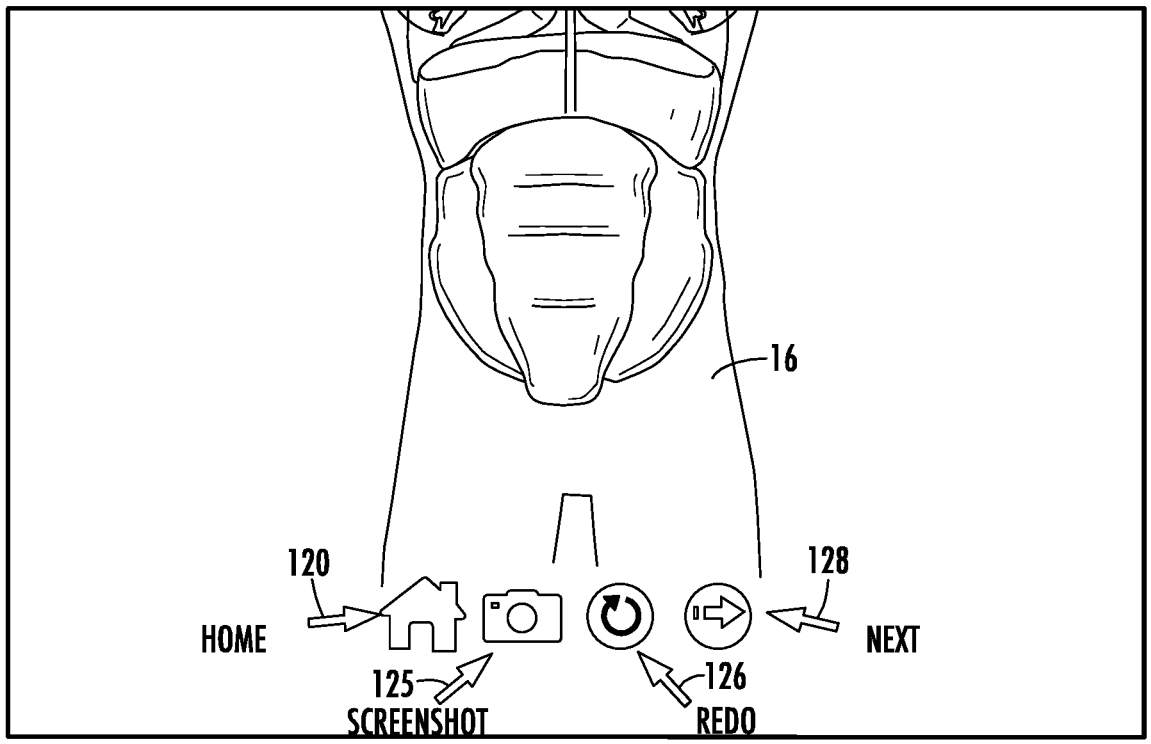
FIG. 20 is an example of an alternative screen shot of the interactive training tool.

FIG. 20 illustrates a screen shot in which the user can visualize the virtual humanoid 16. Various functional icons, such as a home button 120, camera 125 to allow a user to take a picture of the view, redo button 126 to allow a user to redo an exercise, or the next button 128 to move the user to the next view, may be included in the system. A play button may also be included.

Figure 21:
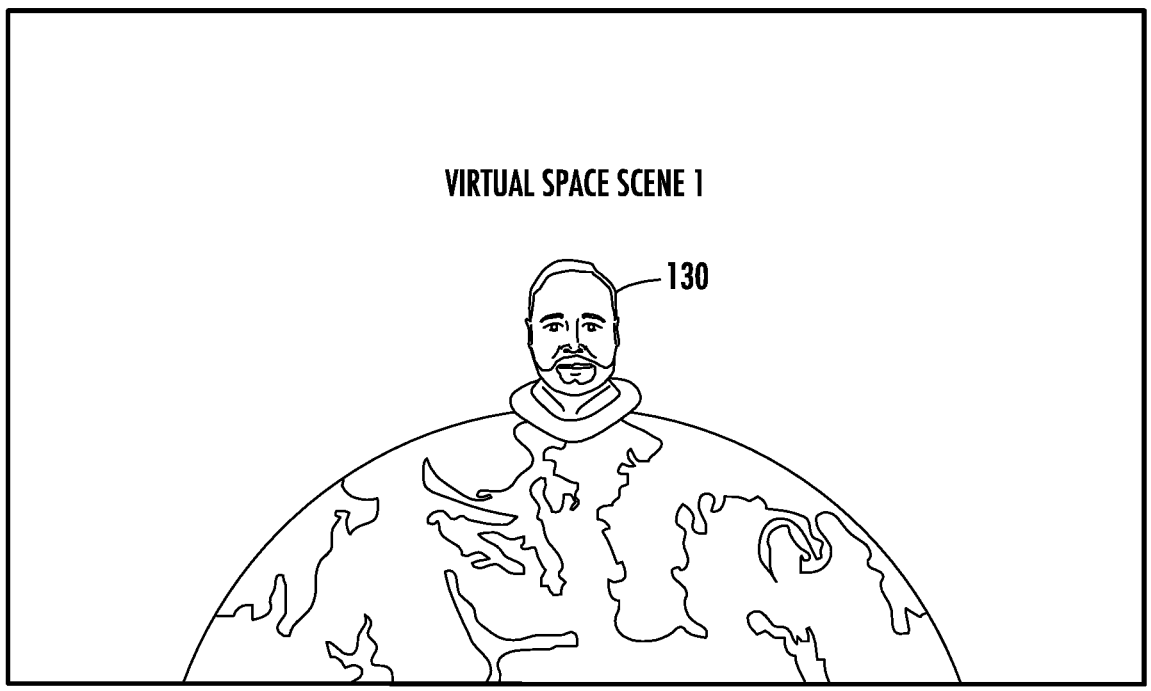
FIG. 21 is an example of a screen shot of the interactive training tool.

FIG. 21 illustrates a screen shot in which an image of an actual human head 130 is viewed. The human head 130 may also provide a recorded message that may be useful in helping the user perform an exercise or interpret a result.

Figure 22:
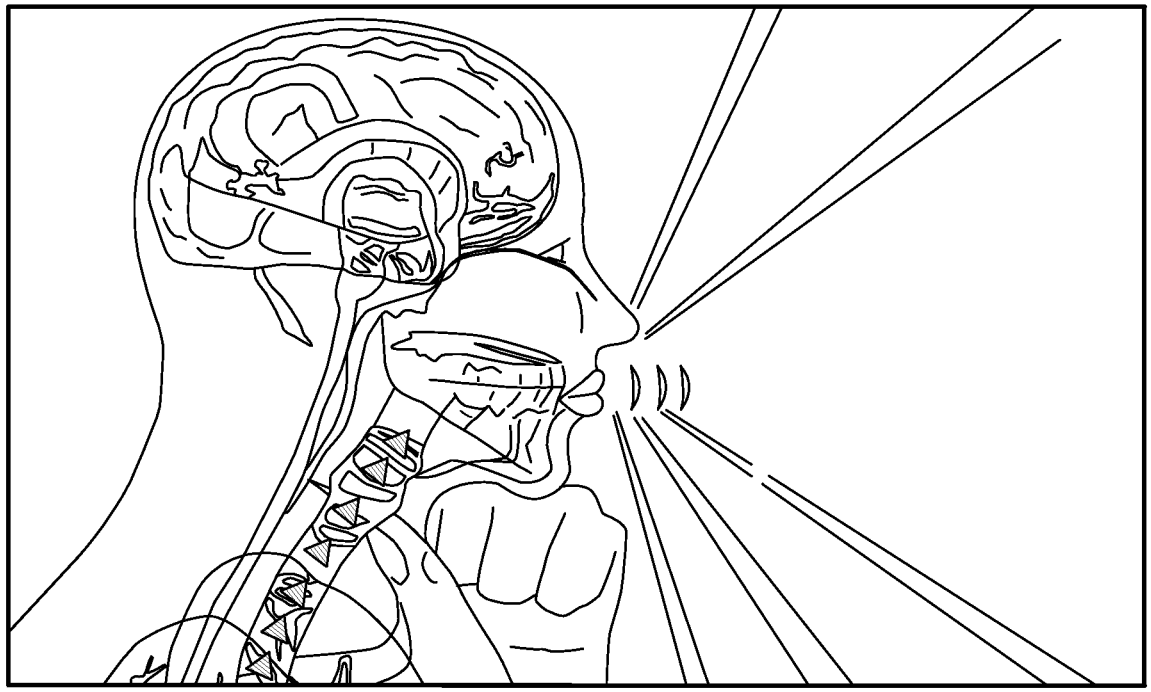
FIG. 22 is an example of a screen shot of the interactive training tool.
Figure 23:
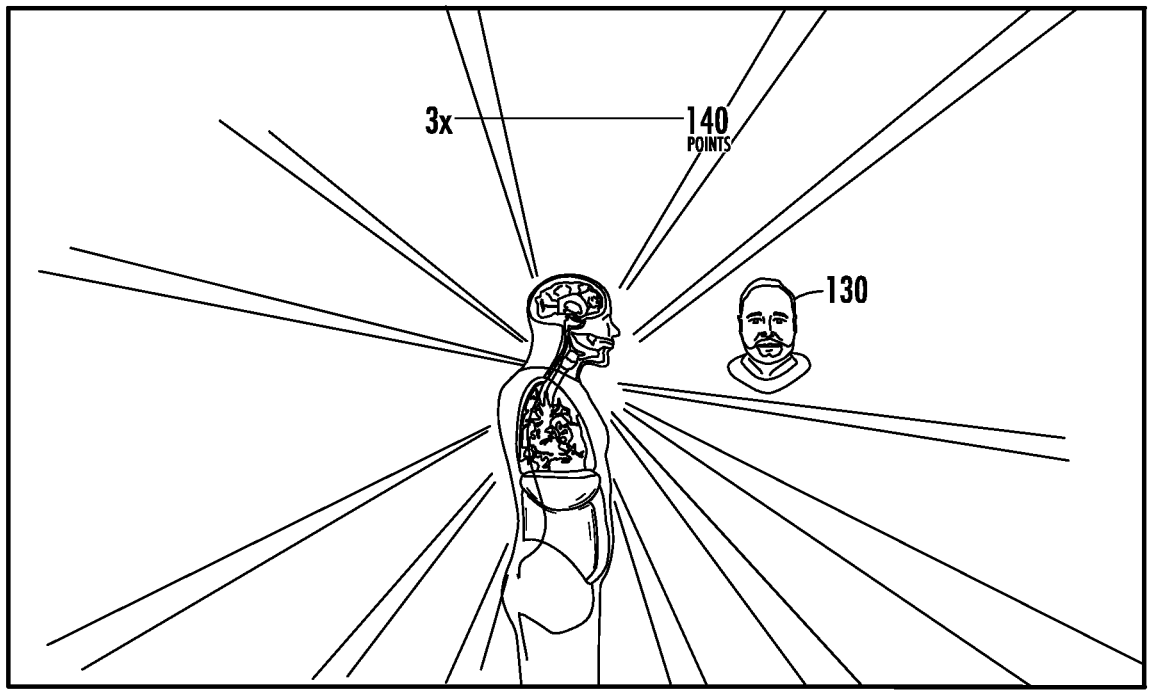
FIG. 23 is an example of a screen shot of the interactive training tool.
Figure 24:
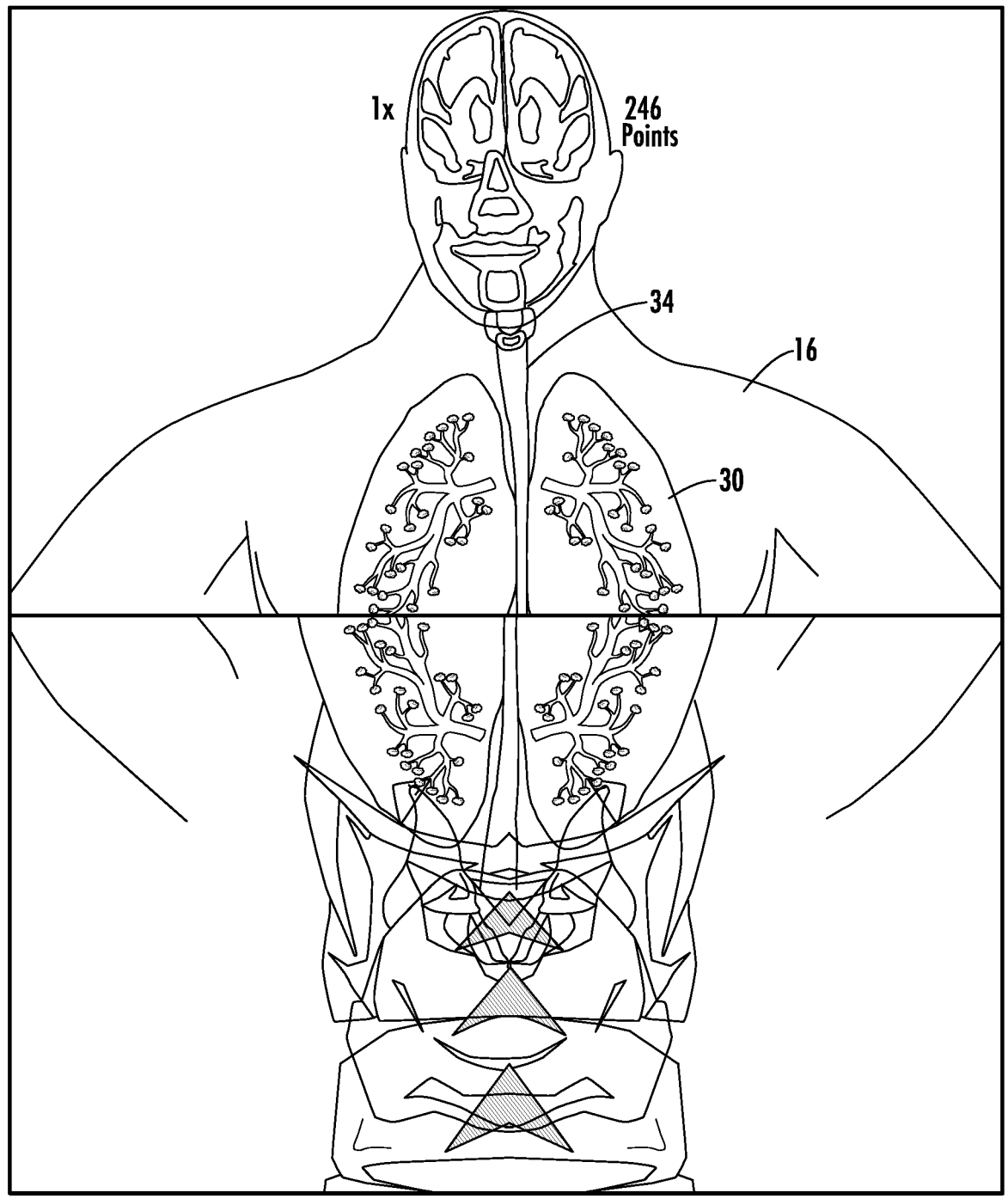
FIG. 24 is an example of a screen shot of the interactive training tool.
Figure 25:
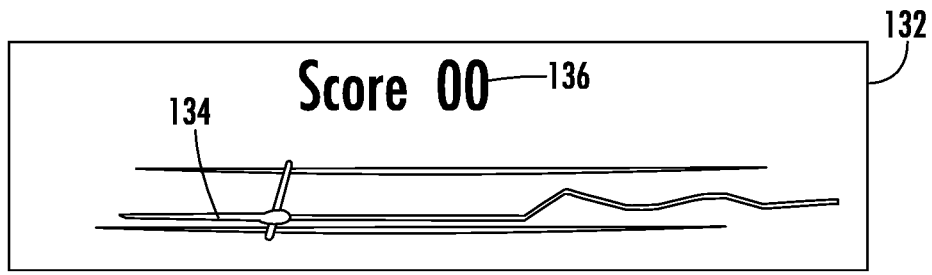
FIG. 25 is an illustrative example of the scoring system of the interactive training tool.
Figure 26:
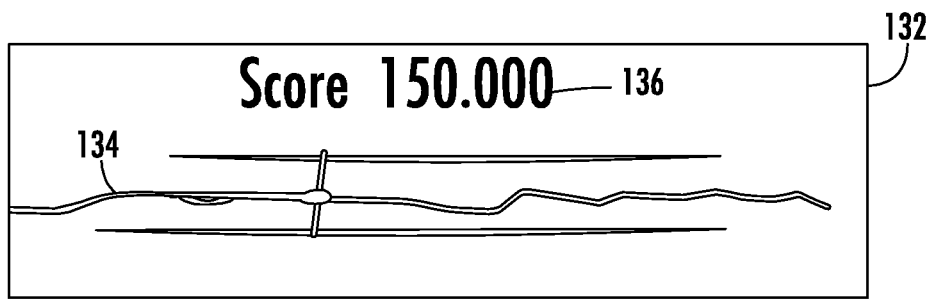
FIG. 26 is an alternative view of the scoring system.
Figure 27:
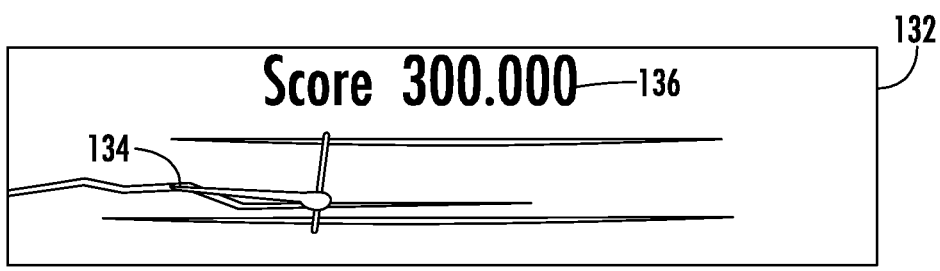
FIG. 27 is an alternative view of the scoring system.

FIG. 22 illustrates a screen shot of an actual exercise module. As shown in the figure, the virtual humanoid 16 is shown with various anatomical features, such as the brain and lips. As the exercise is shown, the effect on the human anatomy components is also visualized. FIG. 23 provides a view showing the virtual humanoid 16 with an image of an actual human head 130. The image of the actual human head 130 may provide a narrative or explanation to compliment what is being visualized in the virtual humanoid 16 portion. FIG. 24 provides an illustration of the humanoid 16 with animations relating to vocal cords.

To aid the user in maximizing the exercises, the system 10, and methods thereof, may include a scoring system image or scoring module 132. The score system 132 is configured to monitor a user's progress during one or more exercises. Line 134 allows for ascending and descending real-time scoring values as notes are hit by the user or the exercises are properly performed. A numerical value 136 may be provided as well. In use, the user will be guided visually how to interact and reach a level of sound required to adjust to the audio guide depicted by a visual target. The visual target may be an animated blue wave that an animated cursor (user) will hit at all times during the exercise to obtain the accuracy level needed for completion of the exercise(s) and measure his/her active current performing skill. The current performing skill level will change with time, development and his/her own personal experience with the system 10.

In an illustrative example, score system or scoring module 132 is configured as follows:

1. Delay to Start: Time lapse before the system may begin registering a score.
2. Multiplier Seconds: Every predetermined (X) seconds, a score multiplier increases in one unit intervals.
3. Multiplier Threshed Seconds: Time, in seconds, the user will be without activating before the counting systems restart.
4. Max Multiplier: Maximum number the user can achieve through multiplying performance for the final score. In an illustrate example, a counter may increase every 5 seconds. If, for example, during 25 seconds the exercise continues to be performed correctly, the exercise multiplier reaches a 5× result, thus representing the max multiplier. If the user misses the target for more than two seconds, reset will occur and the counter goes back to 1×.

Figure 28:
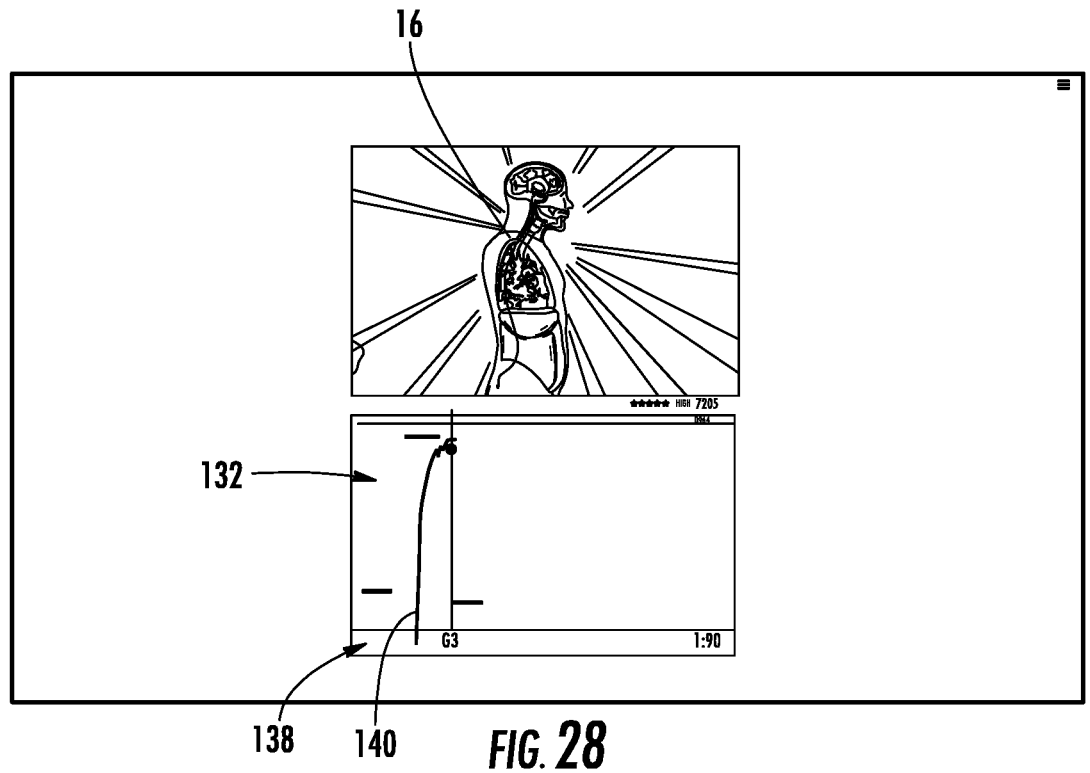
FIG. 28 is an alternative scoring system.
Figure 29:
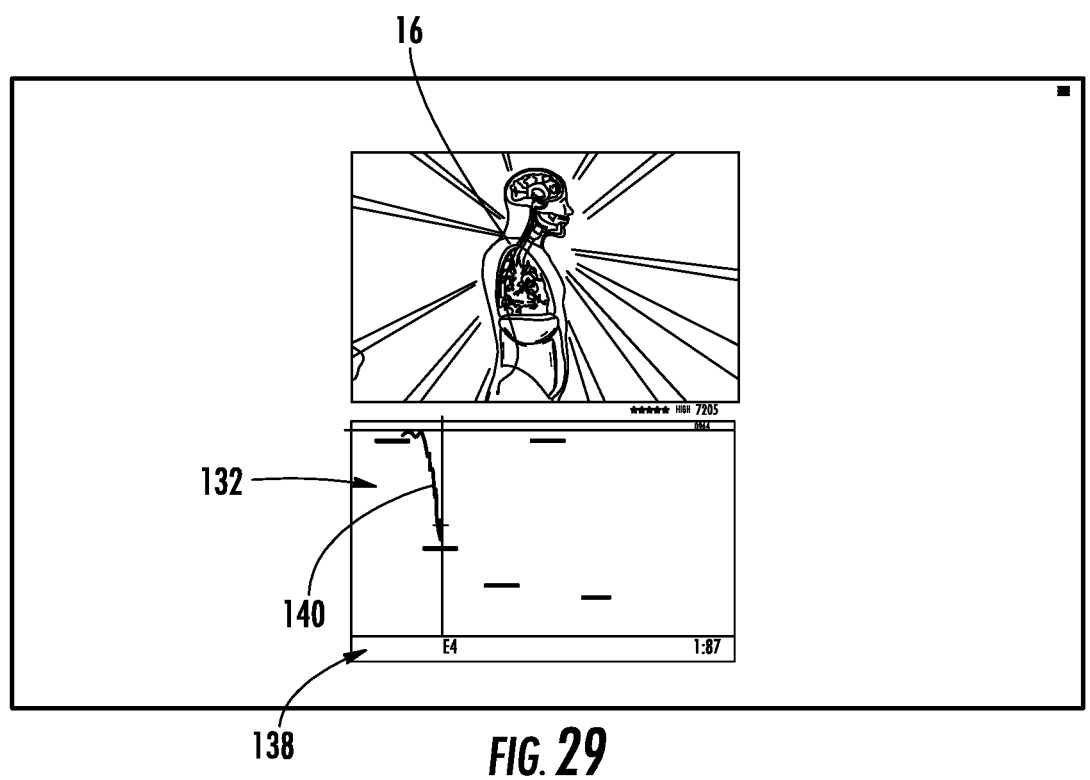
FIG. 29 is an alternative view the scoring system illustrated in FIG. 28.

Referring to FIGS. 28-29, the scoring system or scoring module 132 is shown as a Scoring Spectrograph 138 juxtaposed with the visual image of the virtual humanoid 16. This allows the user to visualize how well they are performing the exercise as the Scoring Spectrograph 138 is scored in real time (graph line 140 moving up or down depending on the user hitting correct markers) and in combination with the visual information of how to properly perform the exercise as illustrated by the virtual humanoid 16. The Scoring Spectrograph 138 is generated based on user (human) accuracy. The user will audibly perform the vocal exercise. Using an in-system microphone, the user's pitch, the airflow, and the accuracy will be analyzed to match the given flow of each particular exercise. The score system can be based on, for example, numbers and stars to aid the user in determining when they are achieving optimal performance for each step in the vocal exercises. As an illustrative example, when the user goes through the variations of sound associated with the specific exercise, the positioning of different muscles is described graphically to exemplify and connect the user's body sound to the animation motion (illustrated by the virtual humanoid 16) so the user can reach the appropriate notes on each instance of every scale that's being practiced. The specific exercise may, for example, ask the user to position the lips as on a motor boat motion and to be aware of the abdominal muscles as the sounding notes reach a higher pitch. The more the user practices and keeps a steady airflow, the better control and the better scoring result received from the guide. The graphic, i.e. the scoring spectrograph 138, will measure and visually display your accuracy.

All patents and publications mentioned in this specification are indicative of the levels of those skilled in the art to which the invention pertains.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An interactive system using a visual character for illustrating various human physiological or anatomical components associated with producing vocals comprising:
    a display unit;
    a processing unit; and
    memory storing instructions configured to cause said processing unit to:
    provide an animated, interactive, visual character in the form of a three dimensionally shaped human being electronically displayed on said display unit, said animated, interactive, visual character displaying, by animation, multiple human anatomical structures or systems of at least nasal anatomical structure(s), mouth anatomical structure(s), vocal cord anatomy, lung anatomy, diaphragm anatomy, abdominal anatomical structure(s), and at least one muscle tissue involved in producing sound or vocals;

provide at least one customizable user interface displayed on said display unit;

provide a training module comprising at least one voice related exercise, wherein, when said at least one voice related exercise is displayed on said display unit, said animated, interactive, visual character, in real time and corresponding to each particular movement or activity associated with said at least one voice related exercise, electronically identifies which of said multiple human anatomical structures or systems are required for the corresponding at least one voice related exercise, and displays movements or positioning of each of said multiple human anatomical structures or systems related to performing said voice related activity as said at least one voice related exercise is demonstrated on said display unit, wherein, each movement associated with said visual character's electronically displayed human physiological or anatomical movements provides visual guidance as to how said at least one voice related exercise should be performed at a time of viewing said training module.

2. The interactive system using a visual character for illustrating various human physiological or anatomical components associated with producing vocals according to claim 1 further including two or more training modules.

3. The interactive system using a visual character for illustrating various human physiological or anatomical components associated with producing vocals according to claim 1, wherein said human anatomical structures or systems are internal organs or muscles responsible for producing sound, interacting and synchronizing muscular movements involved in abdominal support, releasing of air control and neural stimulation in unison with Larynx mobility and gravity, or combinations thereof.

4. The interactive system using a visual character for illustrating various human physiological or anatomical components associated with producing vocals according to claim 1, wherein said display unit is a head mounted display.

5. The interactive system using visual characters for illustrating the various human physiological or anatomical components involved in producing vocals according to claim 4, wherein said head mounted display is a virtual reality headset or display unit.

6. The interactive system using visual characters for illustrating the various human physiological or anatomical components involved in producing vocals according to claim 1, wherein said animated, interactive, visual character is programed to show correct movement(s) of said human physiological or anatomical movements during singing in conjunction with a particular vocal exercise so a user has a visual understanding of how said human physiological or anatomical movements behave or function, and the timing of such actions relative to the singing action of said vocal exercise.

7. The interactive system using visual characters for illustrating the various human physiological or anatomical components involved in producing vocals according to claim 1 further including a scoring system or module.

8. The interactive system using visual characters for illustrating the various human physiological or anatomical components involved in producing vocals according to claim 1, wherein said display unit is an electronic monitor or screen.

9. The interactive system using visual characters for illustrating the various human physiological or anatomical components involved in producing vocals according to claim 1, further including a video, said video having images illustrating how to perform said at least one voice related exercise.

10. The interactive system using visual characters for illustrating the various human physiological or anatomical components involved in producing vocals according to claim 1, wherein each human anatomical structure or system involved in producing sound or vocals is highlighted when a user is performing a corresponding vocal training exercise.

11. The interactive system using visual characters for illustrating the various human physiological or anatomical components involved in producing vocals according to claim 1, further including written instructions to illustrate how to perform a corresponding vocal training exercise displayed on said display unit.

12. The interactive system using visual characters for illustrating the various human physiological components involved in producing vocals according to claim 1 further including a recorded video message or written instructions.

13. The interactive system using visual characters for illustrating the various human physiological components involved in producing vocals according to claim 1 further including a control menu configured to allow a user to modify one or more components of said system.

14. The interactive system using visual characters for illustrating the various human physiological components involved in producing vocals according to claim 1, wherein each of said multiple human anatomical structures or systems are color coded.

15. The interactive system using visual characters for illustrating the various human physiological or anatomical components involved in producing vocals according to claim 1, further including graphics illustrating how to perform a corresponding vocal training exercise displayed on said display unit.

16. The interactive system using visual characters for illustrating the various human physiological components involved in producing vocals according to claim 1 wherein said multiple human anatomical structures or systems further include images or representations of bone structures, spinal structures, brain structures, trachea, blood flow, air flow, or combinations thereof.

17. An interactive method for the development of the voice using a visual character for illustrating the various human physiological or anatomical components involved in producing vocals comprising:

providing an electronically displayed, animated visual character in the form of a three dimensionally shaped human being having multiple human anatomical structures or systems involved in producing sound or vocals;

providing a training module comprising at least one voice related exercise, displayable on a display device;

displaying, on said animated visual character at least nasal anatomical structure(s), mouth anatomical structure(s), vocal cord anatomy, lung anatomy, diaphragm anatomy, abdominal anatomical structure(s), and at least one muscle tissue involved in producing sound or vocals;

corresponding animated movement or positioning of said nasal anatomical structure(s), said mouth anatomical structure(s), said vocal cord anatomy, said lung anatomy, said diaphragm anatomy, abdominal anatomical structure(s), said at least one muscle tissue involved in producing sound or vocals, or combinations thereof, with said at least one voice related exercise;

as said at least one voice related exercise is being displayed, electronically identifying each of said multiple human anatomical structures or systems with the corresponding specific voice related exercise; and displaying one or more movements or positioning of each of said multiple human anatomical structures or systems involved in said at least one voice related exercise, wherein, visual guidance is provided to exemplify and connect said at least one voice related exercise to said animation motion or positioning of said multiple human anatomical structures or systems concurrently with the displaying of said at least one voice related exercise.

18. The interactive method for development of the voice using a visual character for illustrating the various human physiological or anatomical components involved in producing vocals according to claim 17, further including the step of providing an analysis module constructed and arranged to allow a user to visualize said user's performance of said at least one voice related exercise.

19. The interactive method for development of the voice using a visual character for illustrating the various human physiological or anatomical components involved in producing vocals according to claim 17, further including the steps of:
 (1) displaying on said display device, written instructions to illustrate how to perform said at least one voice related exercise;
 (2) displaying on said display device, one or more recorded video messages;
 (3) displaying on said display device, graphics illustrating how to perform at least one voice related exercise; or
 (4) combinations of steps (1)-(3).

* * * * *